United States Patent
Sharma et al.

(10) Patent No.: US 12,177,728 B2
(45) Date of Patent: *Dec. 24, 2024

(54) METHOD AND APPARATUS FOR HANDOFF OF MULTIPLE BEARERS WITH DIFFERING QUALITY OF SERVICE LEVELS IN A WIRELESS COMMUNICATION SYSTEM

(71) Applicants: Sony Group Corporation, Tokyo (JP); Sony Mobile Communications Inc., Tokyo (JP)

(72) Inventors: Vivek Sharma, Basingstoke (GB); Hideji Wakabayashi, Basingstoke (GB); Yuxin Wei, Basingstoke (GB); Anders Berggren, Lund (SE)

(73) Assignees: SONY GROUP CORPORATION, Tokyo (JP); SONY MOBILE COMMUNICATIONS INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/840,610

(22) Filed: Jun. 15, 2022

(65) Prior Publication Data
US 2022/0353753 A1    Nov. 3, 2022

Related U.S. Application Data

(63) Continuation of application No. 16/961,715, filed as application No. PCT/EP2019/050969 on Jan. 15, 2019, now Pat. No. 11,382,004.

(30) Foreign Application Priority Data

Jan. 19, 2018 (EP) .................................... 18152654

(51) Int. Cl.
*H04W 76/15* (2018.01)
*H04W 28/02* (2009.01)
(Continued)

(52) U.S. Cl.
CPC ... *H04W 36/0027* (2013.01); *H04W 28/0257* (2013.01); *H04W 36/00695* (2023.05);
(Continued)

(58) Field of Classification Search
CPC ............. H04W 36/0027; H04W 76/15; H04W 36/0069; H04W 28/0257; H04W 36/28;
(Continued)

(56) References Cited

U.S. PATENT DOCUMENTS

2012/0178493 A1* 7/2012 Marquez ............... H04W 52/40
455/522
2014/0219248 A1    8/2014 Reddiboyana et al.
(Continued)

FOREIGN PATENT DOCUMENTS

WO    2014/158084 A1    10/2014
WO    2016/095115 A1    6/2016
(Continued)

OTHER PUBLICATIONS

International Search Report and Written Opinion mailed on Apr. 17, 2019 for PCT/EP2019/050969 filed on Jan. 15, 2019, 13 pages.
(Continued)

*Primary Examiner* — Un C Cho
*Assistant Examiner* — Lalita W Pace
(74) *Attorney, Agent, or Firm* — XSENSUS LLP

(57) ABSTRACT

A terminal device and a method of operating a terminal device in a wireless communication network. The method comprises establishing, by the terminal device, a first radio connection with a first network access node for transmission of data via a first bearer and a second radio connection with the first network access node for transmission of data via a second bearer. Based on a difference between quality of service for the data transmission via the first bearer and the second bearer, a third radio connection is established
(Continued)

between the terminal device and a second network access node for transmission of the data via the first bearer; and the third radio connection is established between the terminal device and the second network access node, a fourth radio connection is established between the terminal device and the second network access node for transmission of the data via the second bearer.

17 Claims, 7 Drawing Sheets

(51) Int. Cl.
    *H04W 36/00*     (2009.01)
    *H04W 36/18*     (2009.01)
    *H04W 36/28*     (2009.01)

(52) U.S. Cl.
    CPC ........... *H04W 36/28* (2013.01); *H04W 76/15* (2018.02); *H04W 36/0016* (2013.01); *H04W 36/18* (2013.01)

(58) Field of Classification Search
    CPC . H04W 36/0016; H04W 36/18; H04W 88/06; H04W 28/08; H04W 28/084; H04W 36/22; H04W 72/12; H04W 76/34; H04W 36/00695
    See application file for complete search history.

(56) References Cited

U.S. PATENT DOCUMENTS

| | | | |
|---|---|---|---|
| 2014/0241317 A1 | 8/2014 | Jamadagni et al. | |
| 2015/0181473 A1 | 6/2015 | Horn et al. | |
| 2015/0271836 A1* | 9/2015 | Damnjanovic | H04W 72/56 370/329 |
| 2015/0312757 A1 | 10/2015 | Wang et al. | |
| 2016/0021592 A1 | 1/2016 | Vesely et al. | |
| 2016/0029213 A1 | 1/2016 | Rajadurai et al. | |
| 2016/0057663 A1 | 2/2016 | Teyeb et al. | |
| 2017/0013668 A1 | 1/2017 | Chang et al. | |
| 2017/0195933 A1 | 7/2017 | Shi et al. | |
| 2018/0324677 A1 | 11/2018 | Mallick et al. | |
| 2018/0352482 A1 | 12/2018 | Gage et al. | |
| 2019/0028942 A1 | 1/2019 | Tang et al. | |
| 2019/0253942 A1 | 8/2019 | Yoo et al. | |
| 2019/0279428 A1 | 9/2019 | Mack et al. | |
| 2019/0357075 A1 | 11/2019 | Van Der Velde et al. | |

FOREIGN PATENT DOCUMENTS

| | | |
|---|---|---|
| WO | 2016/122367 A1 | 8/2016 |
| WO | 2018/127389 A1 | 7/2018 |
| WO | 2018/172488 A1 | 9/2018 |
| WO | 2018/178075 A1 | 10/2018 |
| WO | 2018/178081 A1 | 10/2018 |

OTHER PUBLICATIONS

3GPP, "5G; NR; Radio Resource Control (RRC); Protocol specification," 3GPP TS 38.331 version 15.3.0, Release 15, ETSI TS 138 331 V15.3.0, Oct. 2018, pp. 1-440.

3GPP, "LTE; Evolved Universal Terrestrial Radio Access (E-UTRA) and Evolved Universal Terrestrial Radio Access Network (E-UTRAN); Overall description; Stage 2," 3GPP TS 36.300 version 14.2.0, Release 14, ETSI TS 136 300 V14.2.0, Apr. 2017, pp. 1-345.

Holma, et al., "System Architecture Based on 3GPP SAE," LTE for UMTS OFDMA and SC-FDMA based radio access, John Wiley & Sons, Ltd., 2009, pp. 25-27.

Huawei, et al., "SgNB to MgNB reconfiguration for 0ms interruption handover," 3GPP TSG-RAN WG2 No. 97bis, R2-1703381, Spokane, USA, Apr. 3-7, 2017, pp. 1-4.

NTT Docomo, "New SID Proposal: Study on New Radio Access Technology," 3GPP TSG RAN Meeting No. 71, RP-160671, Göteborg, Sweden, Mar. 7-10, 2016, 8 pages.

Samsung, "Mobility enhancements for NR SA," 3GPP TSG-RAN WG2 No. 100, R2-1712260, Reno, USA, Nov. 27-Dec. 1, 2017, 3 pages.

Zte Corporation, et al., "Targeting a Lossless handover with 0ms interruption," 3GPP TSG-RAN WG2 Meeting No. 100, R2-1712604 (Resubmission of R2-1710434), Reno, NV, USA, Nov. 27-Dec. 1, 2017, 10 pages.

Dahlman et al., "Future wireless access small cells and heterogeneous deployments," ICT 2013, 2013, pp. 1-5.

* cited by examiner

METHOD AND APPARATUS FOR HANDOFF OF MULTIPLE BEARERS WITH DIFFERING QUALITY OF SERVICE LEVELS IN A WIRELESS COMMUNICATION SYSTEM

CROSS-REFERENCE TO RELATED APPLICATIONS

The present application is a continuation of U.S. application Ser. No. 16/961,715, filed Jul. 13, 2020, which is based on PCT filing PCT/EP2019/050969, filed Jan. 15, 2019, which claims priority to EP 18152654.2, filed Jan. 19, 2018, the entire contents of each are incorporated herein by reference.

BACKGROUND

Field

The present disclosure relates to wireless communications apparatus and methods wherein radio connections for supporting the transmission of data via two bearers, each having a respective quality of service, are established between a terminal device and a network access node.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected that future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of devices may generate or receive categories of data associated with differing quality of service requirements—some low bitrate data may be associated with, for example, a low latency and near-zero packet loss requirement; other data, having a higher bitrate, may be more tolerant of latency and/or packet loss.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles and data transfer requirements, for example in terms of latency and/or reliability targets. See, for example, the 3GPP document RP-160671, "New SID Proposal: Study on New Radio Access Technology," NTT DOCOMO, RAN #71 [1].

The introduction of new radio access technology (RAT) systems/networks gives rise to new challenges for providing efficient operation for devices operating in new RAT networks, including devices able to operate in both new RAT networks (e.g. a 3GPP 5G network) and currently deployed RAT networks (e.g. a 3GPP 4G network).

One particular area where new approaches may be helpful is in relation to handovers between network nodes responsible for communicating with a terminal device, which may be referred to as mobility management. It will be appreciated that handovers may result from a device physically moving between coverage areas of different cells or from changing radio conditions associated with different cells for a static device, and the term mobility management may be used for both scenarios.

In view of the above, there is a desire for new approaches for handling mobility in wireless communications network.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
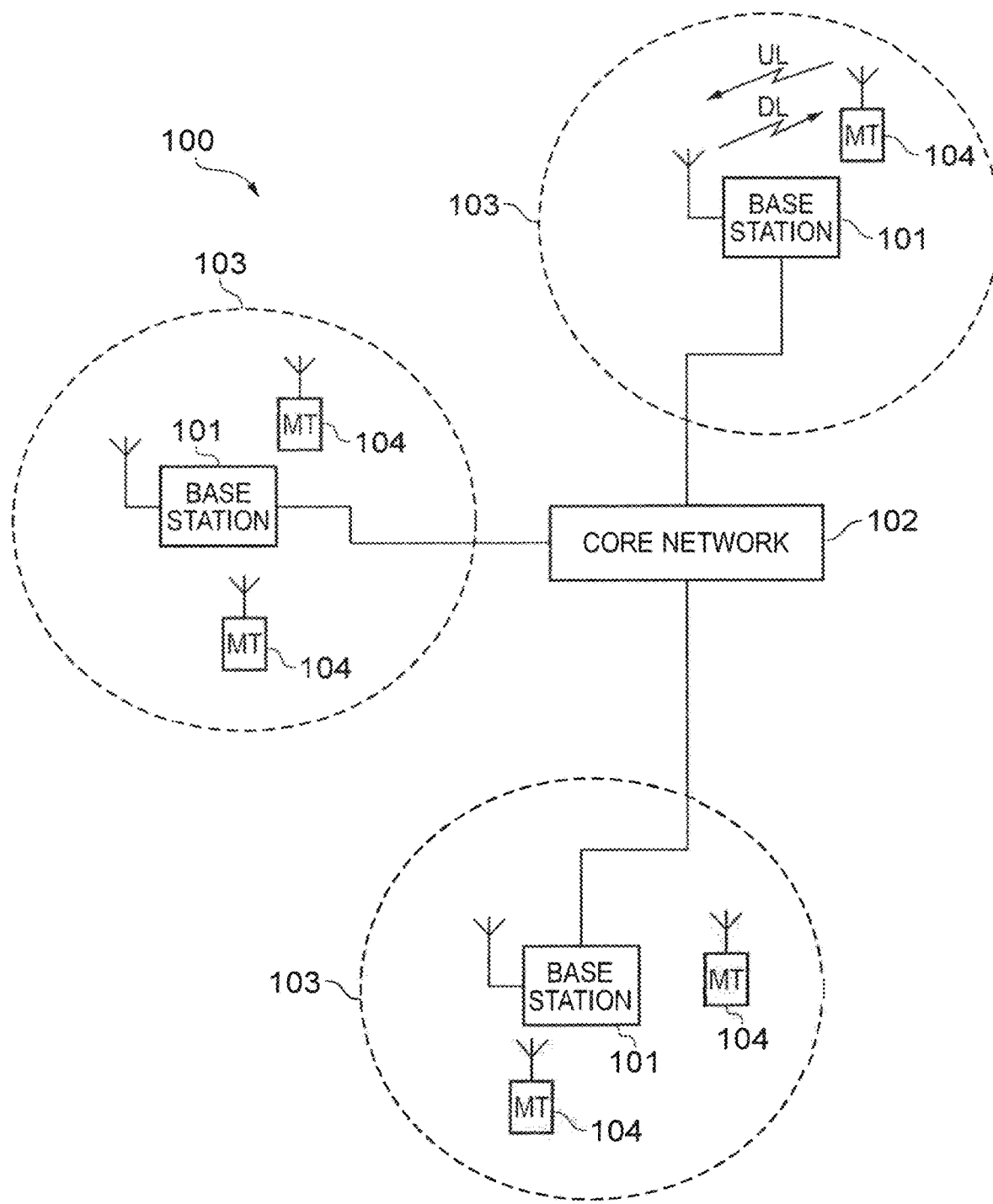
FIG. 1 schematically represents some aspects of a LTE-type wireless telecommunication network which may be configured to operate in accordance with certain embodiments of the present disclosure.

FIG. 1 provides a schematic diagram illustrating some basic functionality of a wireless communications network/system 100 operating generally in accordance with LTE principles, but which may also support other radio access technologies, and which may implement embodiments of the disclosure as described herein. Various elements of FIG. 1 and certain aspects of their respective modes of operation are well-known and defined in the relevant standards administered by the 3 GPP® body, and also described in many books on the subject, for example, Holma H. and Toskala A [2]. It will be appreciated that operational aspects of the wireless communications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless communications systems for elements providing broadly comparable functionality. However, certain embodiments of the disclosure may be equally implemented in different generations of wireless communications systems, and for simplicity particular terminology may be used regardless of the underlying network architecture. That is to say, the use of a specific term in relation to certain example implementations is not intended to indicate these implementations are limited to a certain generation of network that may be most associated with that particular terminology.

Figure 2:
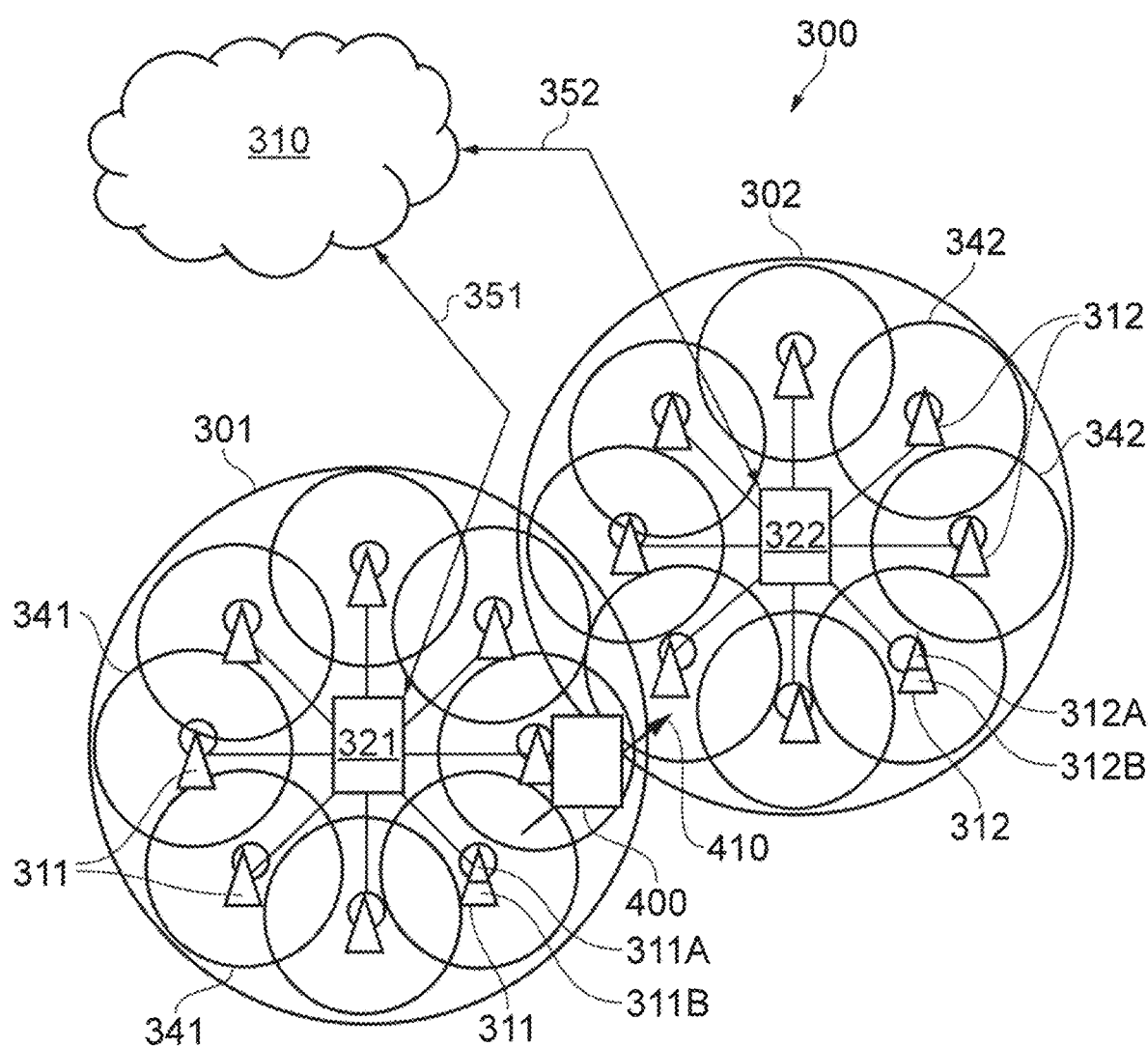
FIG. 2 schematically represents some aspects of a new radio access technology (RAT) wireless communications network which may be configured to operate in accordance with certain embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated that the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus certain embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

As already noted, mobile communications networks such as the network 100 shown in FIG. 1 and the network 300 shown in FIG. 2 may be expected to support a wide range of services having different requirements, for example in terms of data rate, latency and/or reliability targets for the different services, possibly associated with a single terminal device. One example service currently considered to be of interest for next generation wireless communication systems includes so-called Ultra Reliable and Low Latency Communications (URLLC)[1].

URLLC services may be typically characterised as low latency services, for example aiming to transmit relatively small amounts of data through the radio network with a 1 ms packet transit time i.e. so that each piece of URLLC data needs to be scheduled and transmitted across the physical layer in a time that is shorter than 1 millisecond, in order to permit and end-to-end latency between a terminal device's application layer and the edge of the wireless communication network operator's packet network of no more than 1 millisecond). URLLC services typically may require high reliability of data transmission, for example with a 99.999% reliability target. URLLC services may, for example, be applicable for safety-relevant communications, for example, communications relating to autonomous vehicle (driverless car) applications.

An example of a source of data which may require low latency transmission, as may be provided by a URLLC service, is an inertial measurement unit (IMU) associated with a head-mounted display (HMD) for providing a virtual, augmented, or mixed reality experience.

Figure 3:
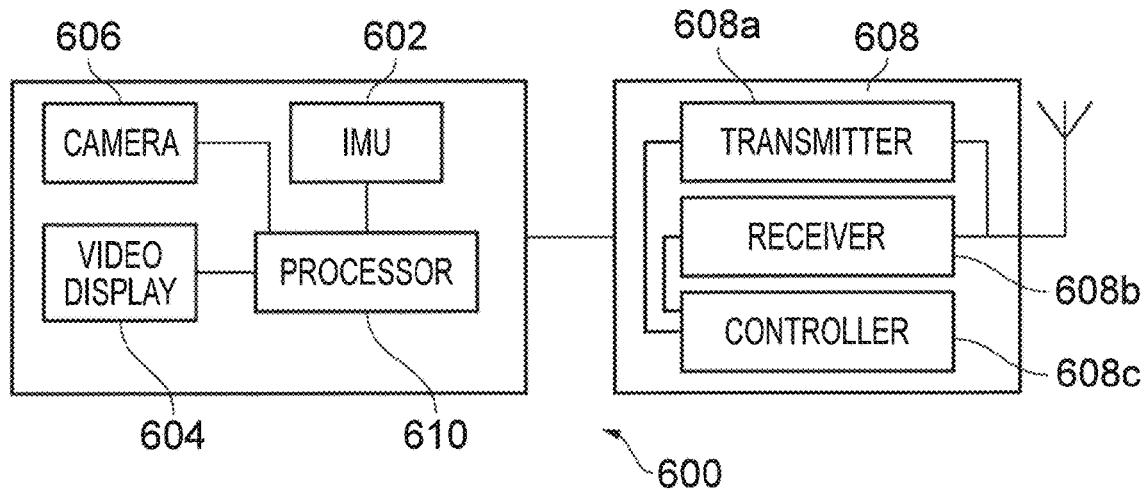
FIG. 3 schematically represents components of a head-mounted display which may be configured to operate in accordance with certain embodiments of the present disclosure.

FIG. 3 illustrates an example HMD 600. The HMD 600 is an image or video display device which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, the contents of which are incorporated herein by reference, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

An inertial measurement unit (IMU) such as the IMU 602, which may be incorporated in the HMD 600, may comprise an accelerometer and gyroscope, each operating in 3 degrees of freedom (DOF). An IMU may thus estimate a change in a user's position, and may be capable of doing so with very low latency.

The HMD 600 may include processor circuitry 610 which may control the camera 606, IMU 602 and video display 604.

The HMD 600 may include, or be connected to, a terminal device 608 and may thus be connected to a wireless communications network, such as those illustrated in FIG. 1 and FIG. 2.

As described above, the HMD 600 may also incorporate a display 604 and/or a camera 606. Video data generated by the camera 606 and/or video data for display on the display 604 may also be communicated via the wireless communications network by means of the terminal device 608.

The terminal device 608 comprises transmitter circuitry 608a for transmission of wireless signals, receiver circuitry 608b for the reception of wireless signals and processor circuitry 608c (which may also be referred to as a processor/processor unit) configured to control the terminal device 608. The processor circuitry 608c may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 608c may comprise circuitry which is suitably configured/programmed to provide the desired functionality described herein using conventional programming/configuration techniques for equipment in wireless communications networks. The transmitter circuitry 608a, receiver circuitry 608b and the processor circuitry 608c are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). Where the terminal device 608 is integrated in the HMD 600 (as shown in FIG. 3), the processor circuitry 608c and 610 may be common (i.e. common processor circuitry may provide the functionality of processor circuitry 608c and processor circuitry 610). It will be appreciated the terminal device 608 and HMD 600 will in general comprise various other elements associated with its operating functionality, for example a power source, user interface, and so forth, but these are not shown in FIG. 3 in the interests of simplicity.

The transmission of data generated by the IMU may require a very low latency, for example, of around 1 millisecond or lower when measured between the HMD and the edge of the wireless communications network, and with substantially no packet loss.

As described above, the HMD 600 may also incorporate a display 604 and/or a camera 606. Video data generated by the camera 606 and/or video data for display on the display 604 may also be communicated via the wireless communications network by means of a terminal device 608 which may be connected to, or integrated into the HMD 600.

Video data for transmission to or from the HMD 600 may be associated with quality of service requirements which provide for the transmission of several Mbps up to around 1 Gbps with an end-to-end latency of around 15 milliseconds or less. The loss of video data is less problematic than the loss of IMU data, but there may nevertheless be a packet loss constraint on the video data.

An HMD may generate or receive additional data, that data being associated with yet further quality of service requirements.

The techniques described herein may provide data services meeting the various quality of service requirements described above in respect of an HMD during a handover, however it will be readily appreciated that the techniques described herein are not so limited, but may be applied in any appropriate scenario, including other augmented, virtual, or mixed reality applications, or indeed any other services not associated with video display.

Embodiments of the present technique can provide a terminal device and a method of operating a terminal device in a wireless communication network. The wireless communication network comprises a first network access node associated with a first cell of the wireless communication network and a second network access node associated with a second cell of the wireless communication network. The method comprises establishing, by the terminal device, a first radio connection between the terminal device and the first network access node for supporting the transmission of data via a first bearer and a second radio connection between the terminal device and the first network access node for supporting the transmission of data via a second bearer. In accordance with a difference between a quality of service for the data transmission via the first bearer and a quality of service for the data transmission via the second bearer, a third radio connection is established between the terminal device and the second network access node for supporting the transmission of the data via the first bearer; and the third radio connection is established between the terminal device and the second network access node, a fourth radio connection is established between the terminal device and the second network access node for supporting the transmission of the data via the second bearer. As will be appreciated different bearers may require different qualities of service even for the same application. For some bearers the quality of service requirements are higher than others such as, for example, URLLC which may be associated with a very low latency requirement and a very low tolerance of packet loss. For such bearers, embodiments of the present invention provide for a handover establishing a radio connection more quickly via a target access node and which can, in some examples, provide dual connectivity so that more reliable communication and/or lower latency communication can be effected during the handover. Having two radio connections active contemporaneously requires greater resources on the radio interface, and additional processing in both the terminal device and in the wireless communication network. For other bearers of the terminal device having less stringent quality of service requirements, embodiments of the present technique may perform a handover which differs in some manner from the handover mechanism used in respect of the first bearer, for example, in the timing, the use (or not) of dual connectivity or the criteria for establishing radio connections with the target access node.

The inventors have recognised that applications, such as HMD applications, may be associated with various sources of data, with the data being associated with (that is, having) differing quality of service requirements. In this regard, it will be recognised that when it is necessary to change the serving cell of a device, such as the HMD 600, during ongoing data transmission it is necessary to ensure that the various quality of service requirements can be satisfied during the handover process. In this regard it will be appreciated that handovers may result from a device physically moving between coverage areas associated with different radio access nodes or from changing radio conditions associated with different cells for a static device.

In a handover procedure a terminal device is moved (handed over) from communicating with a first network access node (e.g. an LTE base station or 5G controlling unit) to communicating with a second network access node (e.g. another LTE base station or 5G controlling unit). The first network access node may be referred to as the source for the handover and the second network access node may be referred to as the target for the handover. A terminal device will typically be handed over from a source network access node to a target network access node because changing radio channel conditions mean the target network access node is better able to serve the terminal device than the source network access node, e.g. because the terminal device is moving. However, a handover may also be initiated for other reasons, for example for load balancing.

Many wireless communications systems perform a handover in respect of all ongoing data communications of a given terminal device as part of a single process. The inventors have recognised that, when a single terminal device is supporting one or more applications which generate or receive data traffic having different quality of service requirements, this approach can be detrimental.

Figure 4:
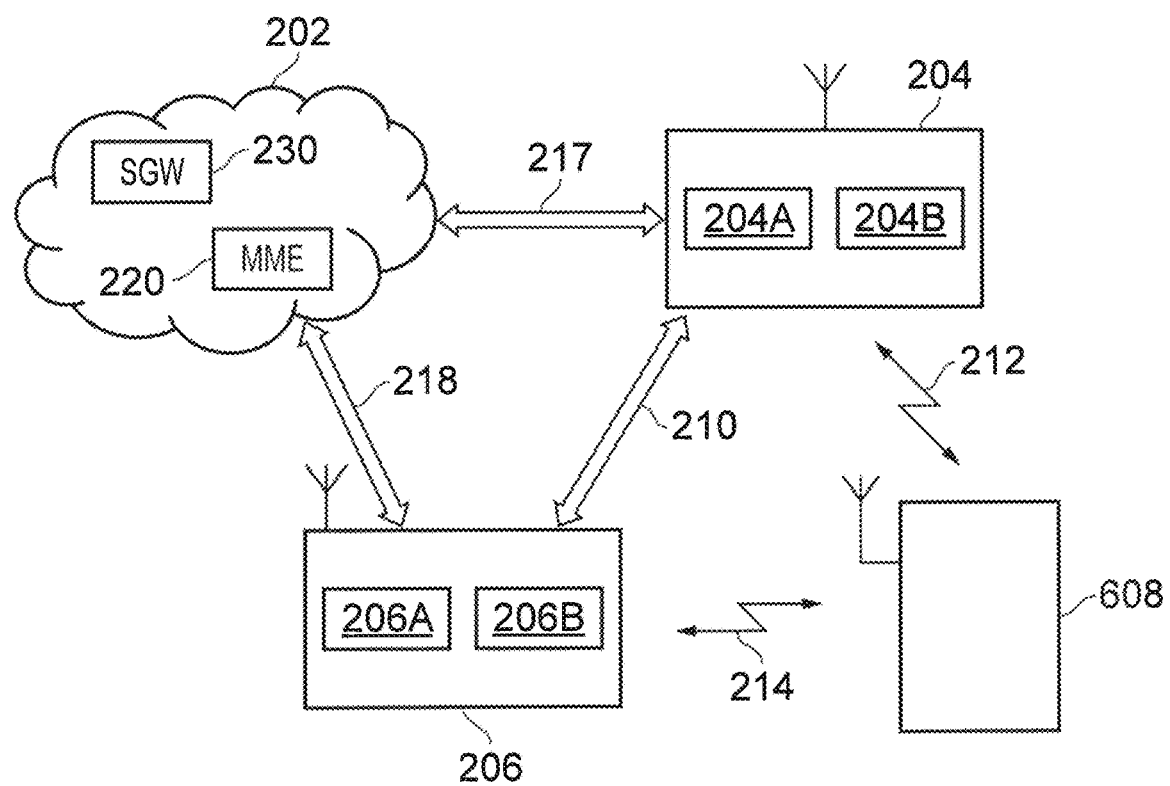
FIG. 4 schematically represents aspects of a wireless communications network which may be configured to operate in accordance with certain embodiments of the present disclosure.

FIG. 4 schematically represents some aspects of a wireless communications system 200 configured to operate to support a terminal device 608 approaching a handover from a source network access node 204 to a target network access node 206 in accordance with certain embodiments of the disclosure. Aspects of the architecture and operation of the communications system 200 which are not specifically described herein may be implemented in accordance with any previously proposed techniques, for example according to current 3GPP standards and other proposals for operating wireless communications systems/networks. The network access nodes 204, 206 may, for convenience, sometimes be referred to herein as base stations 204, 206, it being understood this term is used for simplicity and is not intended to imply the network access nodes should conform to any specific network architecture, but on the contrary, these elements may correspond with any network infrastructure equipment/network access node that may be configured to provide functionality as described herein. In that sense it will appreciated the specific network architecture in which embodiments of the disclosure may be implemented is not of primary significance to the principles described herein.

The communications system 200 comprises a core network part (evolved packet core) 202 coupled to a radio network part. The radio network part comprises the source network access node 204, the target network access node 206, and the terminal device 608. In this example, two network access nodes 204, 206 and one terminal device 608 are shown for simplicity, but it will of course be appreciated that in practice the radio network part may comprise a larger number of base stations serving a larger number of terminal devices across various communication cells.

As with a conventional mobile radio network, the terminal device 608 is arranged to communicate data to and from the network access nodes (base stations/transceiver stations) 204, 206. Typically the terminal device will be connected to (i.e. able to exchange user plane data with) one network access node at a time. However, a terminal device may in some cases be simultaneously connected to both the first and second network nodes, in particular when it is operating in a region where there is a potential for a handover to occur, i.e. when the terminal device is in a boundary region between the geographic footprints associated with the radio coverage (cells) of the respective network nodes. The network access nodes 204, 206 are communicatively connected via respective communication links 217, 218 to the core network part 202, and in particular to a serving gateway, S-GW, 230 in the core network part 202 arranged to perform routing and management of mobile communications services to the terminal devices in the communications system 200 via the network access nodes 204, 206. In order to maintain mobility management and connectivity, the core network part 202 also includes a mobility management entity, MME, 220 which manages the enhanced packet service, EPS, connections with the terminal device 608 operating in the communications system based on subscriber information stored in a home subscriber server, HSS. Other network components in the core network in this example implementation (not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 4 may be broadly conventional apart from where modified to provide functionality in accordance with embodiments of the present disclosure as discussed herein.

The source network infrastructure element/access node 204 comprises transceiver circuitry 204a (which may also be referred to as a transceiver/transceiver unit) for transmission and reception of wireless signals and processor circuitry 204b (which may also be referred to as a processor/processor unit) configured to control the source network access node 204 to operate in accordance with embodiments of the present disclosure as described herein. The processor circuitry 204b may comprise various sub-units for providing functionality in accordance with embodiments of the present disclosure as explained further herein. These sub-units may be implemented as discrete hardware elements or as appropriately configured functions of the processor circuitry. Thus, the processor circuitry 204b may comprise circuitry which is suitably configured/programmed to provide the desired functionality described herein using conventional programming/configuration techniques for equipment in wireless communications systems.

The transceiver circuitry 204a and the processor circuitry 204b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the source network access node 204 will in general comprise various other elements associated with its operating functionality, such as a scheduler. For example, although not shown in FIG. 4 for simplicity, the processor circuitry 204b may comprise scheduling circuitry, that is to say the processor circuitry 204b may be configured/programmed to provide the scheduling function for the source network access node 204.

The target network infrastructure element/access node 206 comprises transceiver circuitry 206a (which may also be referred to as a transceiver/transceiver unit) for transmission and reception of wireless signals and processor circuitry 206b (which may also be referred to as a processor/processor unit) configured to control the target network access node 206 to operate in accordance with embodiments of the present disclosure as described herein. The processor circuitry 206b may comprise various sub-units for providing functionality in accordance with embodiments of the present disclosure as explained further herein. These sub-units may be implemented as discrete hardware elements or as appropriately configured functions of the processor circuitry. Thus, the processor circuitry 206b may comprise circuitry which is suitably configured/programmed to provide the desired functionality described herein using conventional programming/configuration techniques for equipment in wireless communications systems.

The transceiver circuitry 206a and the processor circuitry 206b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). For example, although not shown in FIG. 4 for simplicity, the processor circuitry 206b may comprise scheduling circuitry, that is to say the processor circuitry 206b may be configured/programmed to provide the scheduling function for the target network access node 206.

Thus for the example implementation scenario represented in FIG. 4 it is assumed the terminal device 608 is connected to the source network access node 204 over a radio path 212 and has moved to a location in which it may be handed over to the target network access node 206, e.g. due to mobility, so that it may communicate with the target network access node over the radio path 214. The specific procedure for determining if the terminal device should in fact be handed over may be based on conventional techniques, for example taking account of radio channel conditions associated with the respective radio paths 212, 214 and/or load balancing. A communications link 210 between the network access nodes 204, 206 is provided so they may exchange information, for example to support a handover procedure. In some network architectures the network nodes may communicate directly with one another, as schematically represented in FIG. 4, while in other network architectures they may communicate with one another indirectly via the core network part 202.

Figure 5:
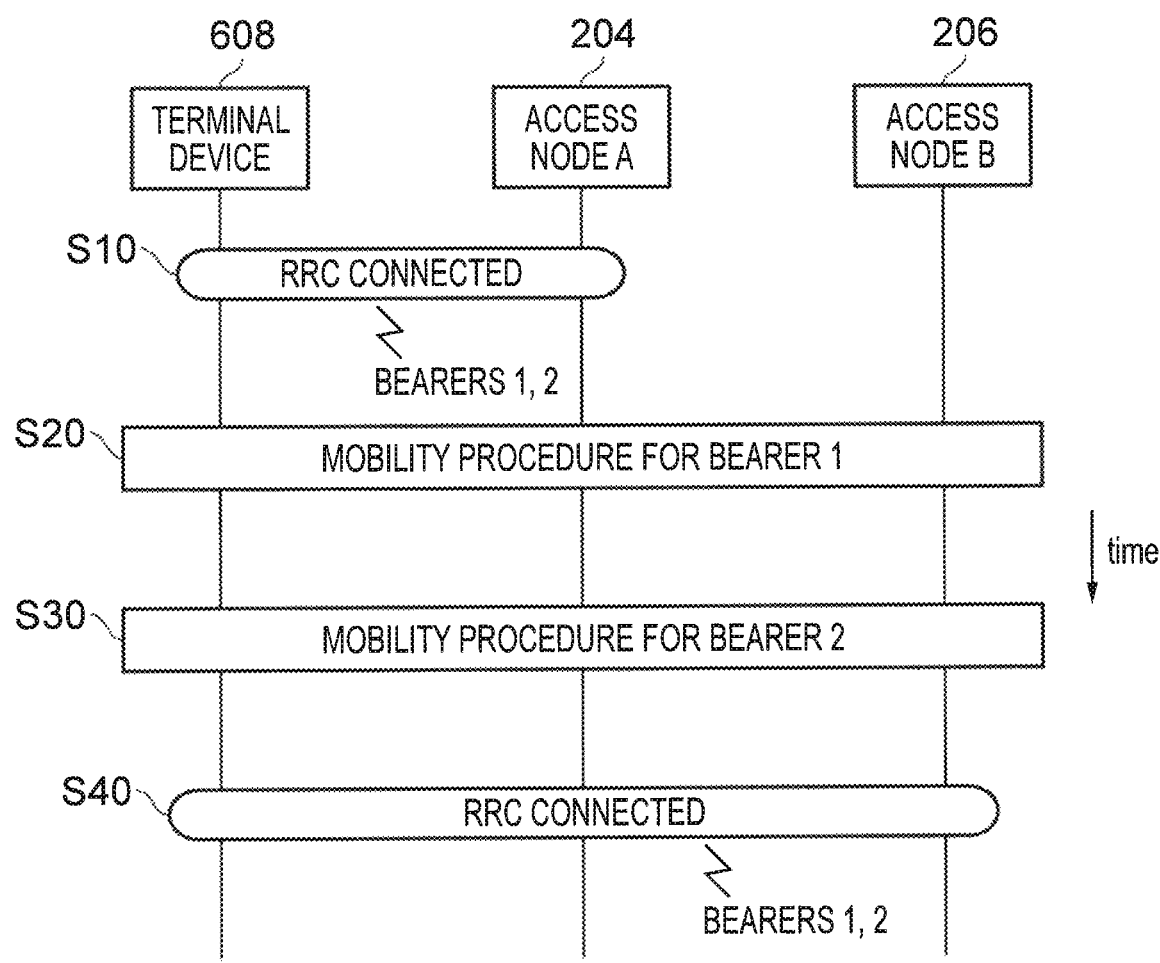
FIG. 5 is a signalling diagram representing aspects of a handover procedure in accordance with certain embodiments of the present disclosure.

FIG. 5 illustrates a sequence chart showing the principles of the techniques describes herein. The sequence starts at step s10 in which the terminal device 608 has established radio connections with the access node A 204 and is in a radio resource configuration (RRC) connected mode. This RRC connected mode provides the radio connections for the transmission of data via bearer 1 and bearer 2.

Not shown in FIG. 5 is an ongoing evaluation of the radio channels between the access node A 204 and the terminal device 608 and also of radio channels between the terminal device 608 and other access nodes such as the access node B 206. Based on these ongoing evaluations a decision is made either by the terminal device 608 or by the access node A 204 to initiate the mobility procedure for bearer 1 illustrated at step s20. The mobility procedure for bearer 1 s20 results in the establishment of a radio connection between the terminal device 608 and the access node B 206 for supporting the transmission of data via bearer 1.

Examples of procedures suitable for carrying out the mobility procedure for bearer 1 at s20 are provided below.

After the radio connection between the terminal device 608 and the access node B 206 for providing for the communication of data associated with bearer 1 has been established, a decision is made either by the terminal device 608 or by the access node A 204 to perform the mobility procedure for bearer 2 at step s30.

The details of this mobility procedure may be substantially the same as that illustrated at s20 or may be different. For example, the mobility procedure at step s20 may result in a dual connectivity configuration being applied to two radio connections supporting bearer 1, while the mobility procedure for bearer 2 at s30 may be a conventional break-before-make handover, in which the radio connection between the terminal device 608 and the access node A 204 providing for the transmission of data associated with bearer 2 is terminated substantially simultaneously with the establishment of a radio connection between the terminal device 608 and the access node B 206.

As will be readily appreciated, if either or both of the first and second mobility procedures (s20, s30) have resulted in a dual connectivity configuration in respect of either the radio connections for bearer 1 or the radio connections for bearer 2, then subsequently the dual connectivity configuration may be terminated. In other words, any radio connection remaining active between the terminal device 608 and the access node A 204 may be released and any bearers in the source cell may be terminated.

If the first mobility procedure s20 for bearer 1 results in a dual connectivity configuration, then in some embodiments of the present technique this may be reconfigured to a conventional single radio channel either substantially at the same time as the initialisation of the mobility procedure s30, or prior to that time, or after the completion of the mobility procedure s30.

Following the completion of both the mobility procedure s20 and the mobility procedure s30 (and the reconfiguration of any dual connectivity configuration), the terminal device 608 is in an RRC connected mode having radio connections with the access node B 206 supporting the transmission of data corresponding to bearers 1 and 2.

FIG. 5 illustrates the use of the present technique in scenarios where two bearers are established by the terminal device 608. However the present technique is not so limited, but may be applied to any number of bearers greater than one. Accordingly, each mobility procedure may apply to one or more bearers. In some embodiments, there may be more than two mobility procedures. Each mobility procedure (characterised by the mobility mechanism, and the triggering criteria) may be selected according to the quality of service requirements associated with the corresponding bearer(s). In some embodiments, one bearer may be associated with data generated by an IMU of an HMD; the second bearer may be used for the transmission of video data for the HMD.

Figure 6:
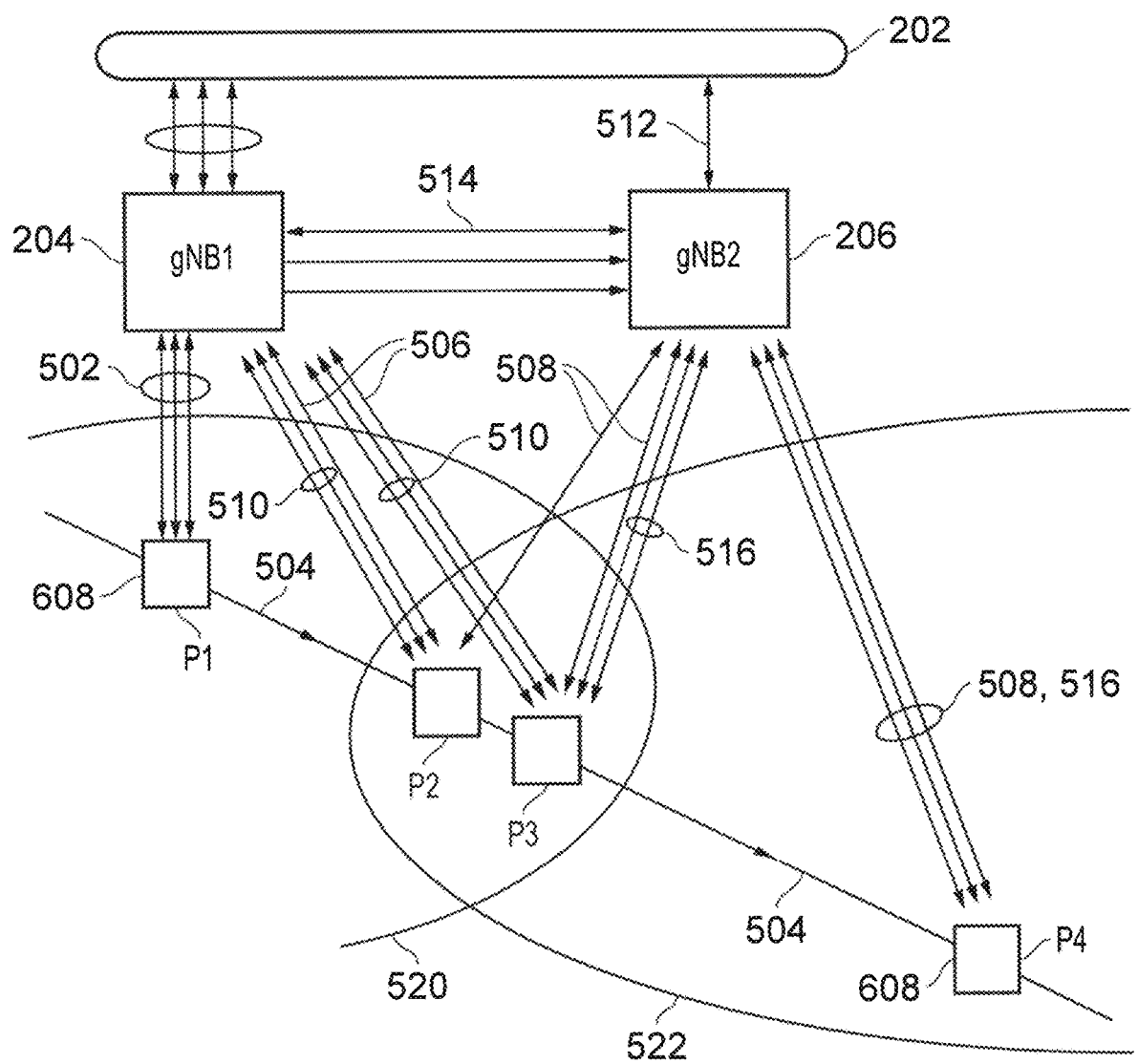
FIG. 6 schematically represents aspects of a handover procedure in accordance with certain embodiments of the present disclosure.

FIG. 6 illustrates an example procedure in accordance with the technique disclosed herein.

In the procedure illustrated in FIG. 6, the terminal device 608 is moving along a track indicated by 504, passing through positions P1, P2, P3 and P4, and hence moving from the coverage of a first cell 520 associated with a source access node, which may be the network access node 204 into the coverage of a second cell 522 associated with a target access node, which may be the network access node 206.

In an initial step, the terminal device 608 is at position P1 and is in RRC Connected mode, having established radio connections 502 with the serving network access node 204 for the support of three bearers, bearers 1 to 3, which support the transmission of data from the terminal device 608 to the core network 202.

In a second step, the terminal device 608, moving along a path 504 has moved to position P2. Based on an evaluation of the radio conditions for the terminal device 608 and taking into account the quality of service requirements for bearer 1, the serving access node 204 triggers either an early handover or a request to establish dual connectivity for bearer one only. In some embodiments of the present technique, resources for radio connections for the support of transmissions via bearers 2 and 3 are also reserved in the target access node 206 in the second step.

The serving access node 204 initiates a handover procedure towards the target access node 206, and the target access node 206 sets up resources for bearer 1 only. The type of handover procedure which is applied only to bearer 1, may depend on the capabilities of the terminal device 608 and may be in accordance with one of the techniques described in co-pending application EP 17163832.3, the contents of which are hereby incorporated by reference.

The target access node 206 may determine whether an end to end latency requirement for bearer 1 cannot be met if user plane data continues to be routed via the source access node 204 to the core network user plane function (for example, via connection 514). In some example embodiments, the source access node 204 may determine whether an end to end latency requirement for bearer 1 cannot be met if the user plane data were to be routed from the target access node 206 to the core network user plane function via the source access node 204. This determination may be carried out before the serving access node 204 initiates the handover procedure towards the target access node 206 for bearer 1, and may indicate the outcome of this determination in the handover preparation signalling.

Determining whether the end to end latency requirement for bearer 1 cannot be met if the user plane data were to be routed from the target access node 206 to the core network user plane function via the source access node 204 may comprise evaluating the backhaul latency conditions for the connections between the source access node 204 and the target access node 206 (e.g. by means of connection 210) and between the target access node 206 and the core network 202. This determination may occur prior to the triggering of a mobility procedure (e.g. before the serving access node 204 initiates a handover procedure towards the target access node 206).

Based on this determination, the target access node 206 may establish a new connection 512 towards the core network 202 is established between the target access node 206 and a user plane function in the core network 202.

As a result, data for bearer 1 is transmitted via both radio connections 506 between the terminal device 608 and the source access node 204, and by radio connections 508 between the terminal device 608 and the target access node 206. Data for bearer 2 and bearer 3 is transmitted via connections 510 between the terminal device 608 and the source access node 204.

In a next step, the terminal device 608 has moved to position P3 and the source access node 204 determines that handover criteria are met in respect of the radio connections for bearers 2 and 3. These criteria may be based on radio channel measurements made by the terminal device 608, radio resource management (RRM) policies of the source access node 204 and the quality of service requirements for bearers 2 and 3.

Based on this determination, the source access node 204 initiates a conventional handover procedure for bearers 2 and 3. This results in the establishment of radio connections 516 between the terminal device 608 and the target access node 206 for bearers 2 and 3, and the release of the radio connections 510 between the terminal device 608 and the source access node 204 for bearers 2 and 3. During the handover for bearers 2 and 3, radio connections for bearer 1 may remain unchanged.

In a further step, the terminal device 608 has moved to position P4. The radio connection 506 supporting bearer 1 between the terminal device 608 and the source access node 204 is released.

In some embodiments, the release of the radio connection 506 supporting bearer 1 between the terminal device 608 and the source access node 204 occurs at substantially at the same time as the release of the radio connections 510 supporting bearers 2 and 3 between the terminal device 608 and the source access node 204.

Figure 7:
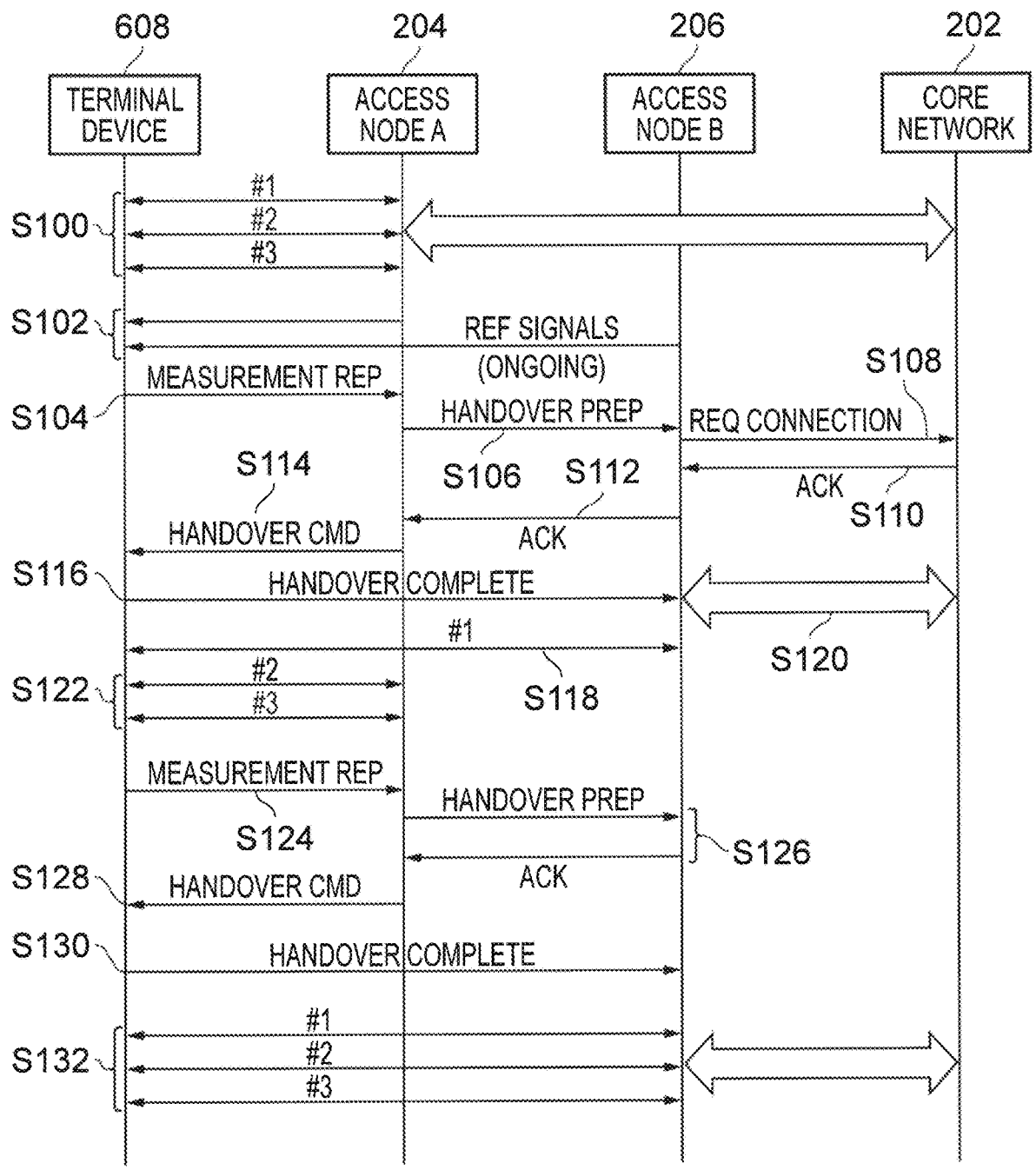
FIG. 7 is a signalling diagram representing aspects of a handover procedure in accordance with certain embodiments of the present disclosure.

FIG. 7 illustrates an example producer according to the techniques described herein. In the example of FIG. 7, the terminal device 608 has established three bearers. The first mobility procedure is applied to bearer 1, and the second mobility procedure is applied to bearers 2 and 3.

In some embodiments, bearer 1 may be configured to transmit data generated by an IMU in an HMD and thus (or otherwise) be associated with a requirement for very low latency transmission. In some embodiments, bearer 2 may be associated with video data either generated by a camera integrated with an HMD or for display on a display screen of an HMD, or both; bearer 2 may thus have quality of service requirements appropriate for video data (which may be characterized by requirements for one or more of a high bandwidth, a relatively low packet loss, and a low delay). In some embodiments, bearer 3 may be used for other data generated by, or for the use of, a processor associated with an HMD.

The procedure starts at s100 in which the terminal device 608 is in an RRC connected mode and has ongoing radio connections with the access node A 204 providing for the transmission of data associated with bearers 1, 2 and 3. Data from the access node A 204 is transmitted to the core network 202 by means of one or more connections between the access node A 204 and the core network 202.

At step s102 reference signals are transmitted on an ongoing basis by each access node. These reference signals are received and measured periodically by the terminal device 608. This measurement of radio channel conditions may, for example, comprise measurements of reference signal received power, RSRP, and/or reference signal received quality, RSRQ. In general, the process of establishing measurements of radio channel conditions between the terminal device and the different network access nodes may be performed in accordance with conventional techniques. Furthermore, it will be appreciated that while FIG. 7 schematically represents reference signals being transmitted only once (in step s102), in practice, and as is well established, reference signals will be transmitted on an ongoing/continuous basis throughout the processing represented in FIG. 7.

Based on the evaluation of the reference signals the terminal device 608 may transmit at step s104 a measurement report to the serving access node, that is, the access node A 204. The access node A 204 may evaluate the measurement report received at s104. Alternately or additionally, the access node A 204 may monitor the radio channels between the terminal device 608 and the access node A 204 based on received signals transmitted by the terminal device 608.

Based on these evaluations, the access node A 204 may initiate a handover in respect of one of the bearers. In the example shown in FIG. 7 the access node A 204 initiates a handover for the radio connection supporting the transmission of data associated with bearer 1, by transmitting a handover preparation message s106 to the selected target access node, that is, the access node B 206.

In response to receiving the handover preparation message s106, the access node B 206 may establish, at steps s108 and s110, a connection with the core network 202, in order to support the transmission of data associated with bearer 1 of the terminal device 608. After this connection is established, the access node B 206 responds by means of an acknowledgement to the access node A 204 in step s112.

In some embodiments of the present technique, the access node B 206 may determine whether or nor it is necessary to establish a connection with the core network 202. This determination may be based on the quality of service (and particularly, latency) requirements for the bearer(s) subject to the mobility procedure. In particular, if it has been determined (either by the access node B 206 or by the access node A 204) that routing user plane data to the core network 202 via the access node A 204 may result in the latency requirement not being met, then the access node B 206 may initiate the establishment of a direct connection with the core network 202 by means of steps s108 and s110.

In some embodiments of the present technique, the access node B 206 performs admission control (not shown in FIG. 7) to determine whether it is able to accept the handover request. This ensures that, for example, sufficient radio resources are available at the access node B 206 and in its associated cell to support the quality of service requirements associated with bearer 1.

In response to receiving the acknowledgement message s112, the access node A 204 transmits a handover command s114 to the terminal device 608. The handover command s114 contains details of radio resources to be used in the target cell associated with the access node B 206. The handover command s114 may also indicate that the handover is to be carried out in respect of a radio connection for the transmission of data associated with bearer 1.

In response to receiving the handover command s114, the terminal device 608 establishes a radio connection with the access node B 206. As part of this establishment the terminal device 608 may send a handover complete message s116.

Following the establishment of the radio connection between the terminal device 608 and the access node B 206, data associated with bearer 1 may be transmitted directly to the access node B 206 in step s118. The access node B 206 forwards the received data via the connection established at steps s108 and s110 with the core network 202 as shown at step s120 or to the access node A 204 (e.g. via the connection 210 shown in FIG. 4). Since the handover procedure was performed in respect of radio connections for bearer 1 only, the radio connections which were ongoing between the terminal device 608 and the access node A 204 for the transmission of data via bearers 2 and 3 remain ongoing in step s122.

Subsequently the terminal device 608 transmits a further measurement report s124, based on which the access node A 204 determines that it is appropriate to perform a mobility procedure in respect of the radio connections used for the transmission of data via bearers 2 and 3. The access node A 204 therefore initiates a handover preparation phase with the access node B 206 to request the access node B 206 to reserve resources for the establishment of radio connections between the terminal device 608 and the access node B 206, meeting the quality of service requirements associated with bearers 2 and 3. This request and a positive response are shown at step s126.

In response to receiving a positive acknowledgement from the access node B 206, the access node A 204 transmits a handover command message s128 to the terminal device 608. This indicates radio resources to be used for the establishment of radio connections with the access node B 206. In response to receiving the handover command s128, the terminal device 608 establishes radio connections with the access node B 206. This may be by means of the transmission of a handover complete message s130 to the access node B 206.

Once the radio connections between the terminal device 608 and the access node B 206 have been established for the transmission of data associated with bearers 2 and 3, the terminal device 608 is thereby in RRC connected mode with the access node B 206 and radio connections are established for the transmission of data via bearers 1, 2 and 3 as shown at step s132. As described above, the mobility procedures in steps s20 and s30 of FIG. 5 need not be identical, but may differ, for example, based on the quality of service requirements of the respective bearers.

Other handover or mobility procedures may therefore be used in respect of one or more of the bearers, without departing from the scope of the herein described techniques.

For example, a decision to initiate a phase of a mobility procedure may be based on one or more of downlink reference signals (such as the downlink reference signals s102 in FIG. 7) as measured by the terminal device 608, uplink reference signals which may be transmitted by the terminal device 608 and received and measured by one or more of the access node A 204 and the access node B 206, a load of one or more of the access nodes 204, 206, and a predicted location of the terminal device 206. In some embodiments, reports of measurements of reference signals are transmitted by the access node or terminal device performing the measurements, to the entity responsible for initiating the mobility procedure.

In FIG. 7, only one target access node (the access node B 206) is shown. However, in some embodiments, more than one candidate target access node may be identified, based on, for example, measurements of reference signals as described above. In some embodiments, the source access node A 204 may initiate a handover preparation procedure (such as the procedure initiated in step s106 of FIG. 7 and described above) in respect of more than one target access node.

In embodiments in which multiple target access nodes are prepared (that is, are requested to reserve resources for one or more bearers), a further step comprises determining to which, if any, access node the bearer handover should occur. This may be based on criteria based on measurements of downlink reference signals, measurements of uplink reference signals, the load of one or more of the access nodes (including the source access node and the target access nodes) and a predicted location of the terminal device 206.

The predicted location of the terminal device 206 may be determined based on conventional location technologies (such as cell identification-based, satellite positioning systems) and sensors integrated with or connected to the terminal device 206, for example, such as an IMU forming part of a HMD which is integrated with or connected to the terminal device 206.

Examples of handover procedures based on uplink reference signals, and illustrating the preparation of multiple handover target cells (and hence access nodes) are described in co-pending application EP 17150360.0, the contents of which are hereby incorporated by reference.

In some embodiments of the present technique, one or more of the mobility procedure may comprise an early handover procedure. Details of an early handover process suitable for the present techniques may be found in co-pending application EP 17162884.5 which is hereby incorporated by reference.

Figure 8:
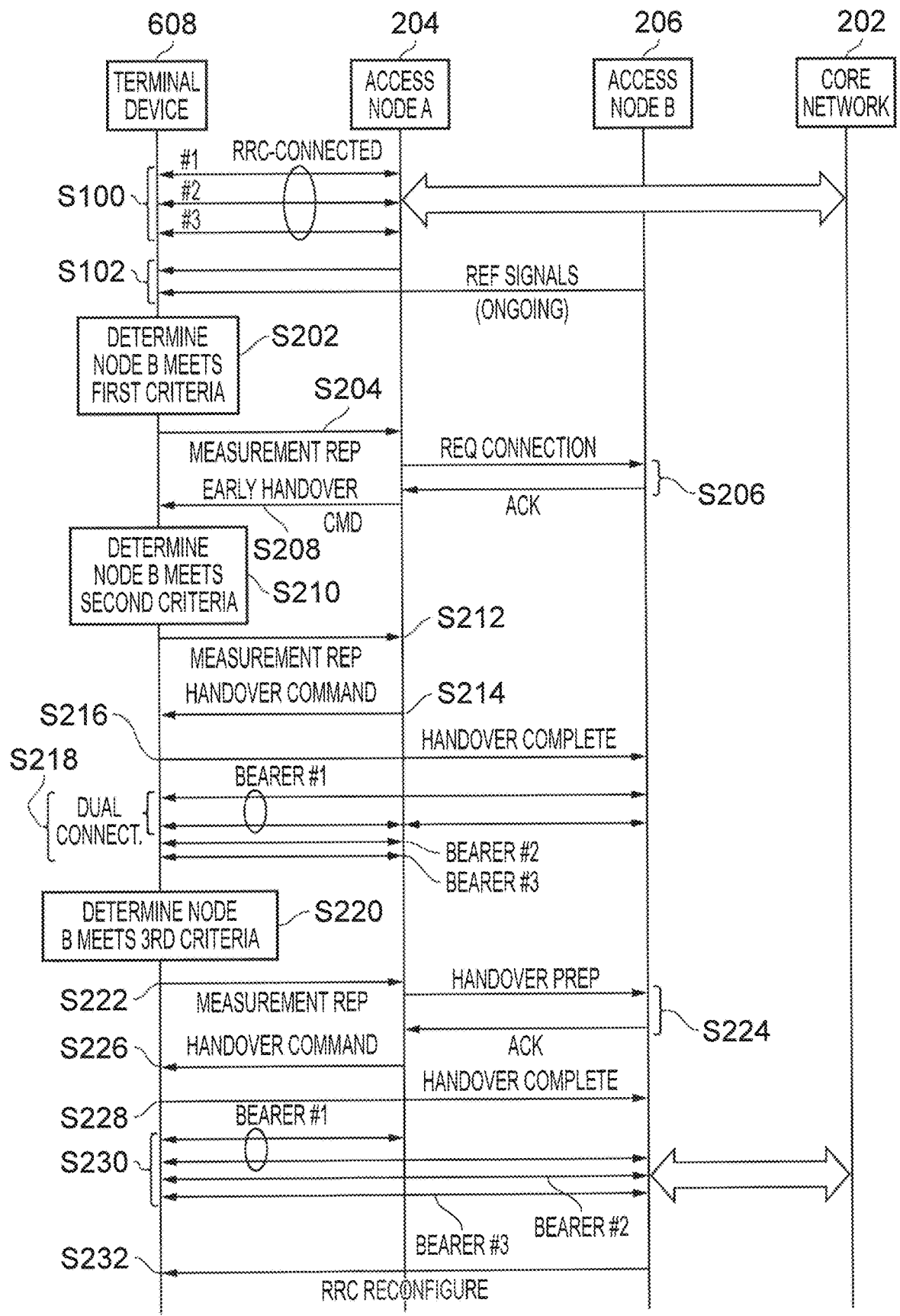
FIG. 8 is a signalling diagram representing aspects of a handover procedure in accordance with certain embodiments of the present disclosure.

FIG. 8 illustrates a process in accordance with the present techniques in which the first mobility procedure comprises an 'early handover', resulting in a temporary dual connectivity configuration, while the second mobility procedure comprises a break-before-make procedure. In the example shown in FIG. 8, the decision to initiate each mobility procedure (and within the early handover procedure, each stage of the procedure) is made by the terminal device 608.

Steps s100 and s102 correspond to the like-numbered steps described above in respect of FIG. 7.

At step s202, the terminal device 608 determines that the access node B 206 meets certain pre-determined criteria associated with the first stage of the mobility procedure for bearer 1. This may correspond to determining that a measurement event has been triggered in respect of access node B 206. For the sake of this example, it will be assumed the first predefined criterion satisfied in step s202 is associated with a measurement event whereby it is determined that current radio channel conditions associated with the first candidate target network access node 206 are better than radio channel conditions associated with the serving network access node 204 by at least a first threshold amount. The first threshold amount may also be referred to as a first offset (offset 1)

In response to this determination, the terminal device 608 transmits a measurement report s204 to the access node A 204.

On receiving the measurement report from the terminal device 608 in step s204, the access node A 204 performs a handover preparation for the radio connection associated with bearer 1 at step s206 by communicating with the network access node in respect of which the measurement report was triggered (in this case the access node B 206) to provide the access node B 206 with configuration information relating to the terminal device 608, for example the terminal device context and so forth, and to receive from the access node B 206 an indication of information to be used by the terminal device 608 to connect to the access node B 206, for example information relating to radio bearer settings and a dedicated random access channel, RACH, preamble that will be reserved for the terminal device 608.

In step s208 the source network access node 204 transmits an early handover command to the terminal device 608 to provide the terminal device 608 with an indication of connection information to be used by the terminal device 608 for establishing a radio connection for the support of the transmission of data via bearer 1 to the access node B 206. The specific information provided in the early handover command will depend on the specific implementation at hand but may include, for example, an indication of a dedicated random access channel, RACH, preamble.

After having received the connection information relating to the access node B 206 in step s208, the terminal device starts to monitor radio channel conditions associated with the access node B 206, and to determine whether or not the conditions satisfy a second trigger criterion. This aspect of the processing may broadly correspond with step s202, but be associated with a different, higher, threshold. That is to say, this aspect of the processing may be configured to determine when the radio channel conditions associated with the access node B 206 become even better than the radio channel conditions associated with the current source network access node (node A 204) by at least a threshold amount. While the terminal device is doing this, it is also still monitoring for whether any other candidate target network access nodes satisfy the first trigger criterion.

In step s210 it is assumed that a second measurement event is triggered in respect of the access node B 206. That is to say, it is assumed that the terminal device 208 determines the radio channel conditions associated with the access node B 206 satisfy a predefined second trigger criterion. In this example the predefined second criterion corresponds in type with the predefined first criterion, but is associated with a different, higher, threshold. That is to say, for the radio channel conditions associated with the access node B 206 to satisfy the second trigger criterion in step s210, the terminal device 608 determines that a quality characteristic associated with measurements of radio channel conditions for the access node B 206 is better than a corresponding quality characteristic associated with measurements of radio channel conditions for the current serving network access node (access node A 204) by an amount which is higher than the amount required to satisfy the first predefined criterion in step s202. This may occur, for example, because the terminal device has continued moving towards the access node B 206 so that the path loss between the access node B 206 and the terminal device 608 has continued to decrease, thereby improving radio channel conditions even further until they become good enough to meet the second predefined trigger criterion.

Thus in step s210 there is a determination that current radio channel conditions associated with the access node B 206 are better than radio channel conditions associated with the serving network access node A 204 by at least a second threshold amount that is greater than the first threshold amount. The second threshold amount may also be referred to as a second offset (offset 2). The difference between offset 1 and offset 2 may itself be considered an early handover offset. That is to say, offset 2 represents the level of offset required to trigger a handover, whereas the lower offset, offset 1, represents the level of offset required to provide the terminal device with advance connection information (early handover command) in the expectation a handover may later occur when the second offset is met.

In response to determining the measurement event (second trigger criterion met) is triggered in step s210 in respect of the access node B 206, the terminal device transmits a measurement report to indicate this to the source network access node A 204, as schematically indicated in step s212. This step may in some cases be performed in accordance with conventional signalling techniques.

On receiving the indication the second trigger criterion is met in respect of the access node B 206 in step s212, the source network access node A 204 may determine that the handover to the access node B 206 should proceed, and transmit a simplified handover command to the terminal device 608, as schematically indicated in step s214. This handover command may be simplified inasmuch as it does not need to convey connection information needed by the terminal device to connect to the selected candidate target network access node (the access node B 206 in this example) which has already been provided to the terminal device in the early handover command of step s208.

As schematically indicted in step s216, in response to receiving the simplified handover command in step s214, the terminal device 608 performs the establishment of the radio connection supporting the transmission of data via bearer 1, based on the connection information/configuration information received in the early handover command of step s208 and sends a handover complete to the access node B 206 (i.e. to the selected candidate target network access node, this network access node being selected on the basis of the second trigger criterion being met while the terminal device had stored connection information for this candidate target network access node).

As schematically indicated step s218, the terminal device can thus synchronise to the access node B 206 (if synchronisation is needed) and operate in an RRC connected mode with respect to the access node B 206.

The establishment of a connection (either directly, or via the access node A 204) between the access node B 206 and the core network 202 is not shown in FIG. 8, but it will be appreciated that this can be carried out using conventional techniques, for example, during step s206.

In the example shown in FIG. 8, the terminal device 608 is assumed to support a dual connectivity configuration, for example because the device 608 comprises dual transmitters/receivers (transceivers). The establishment of the radio connection between the terminal device 608 and the access node B 206 results in the terminal device 608 operating in a dual connectivity configuration with respect to bearer 1. As such, bearer 1 may be, at step s218, operating in a 'split bearer' configuration at least during the mobility procedure. Alternatively, bearer 1 may be supported by a plurality of PDCP entities, each PDCP entity having a peer PDCP entity in a different access node; in other words, bearer 1 may be supported by simultaneous connections with two different cells (which may be operating at different frequencies).

In FIG. 8, the establishment of a temporary dual connectivity configuration to support bearer 1 is shown by means of various handover preparation signalling. In some other embodiments the source access node 204 may send a "SeNB addition request" message to the target access node 206. The target access node 206 may reply with a "SeNB addition Ack" and, in response, the source access node 206 may send an RRC reconfiguration message to the terminal device 206.

After the establishment of the radio connection between the terminal device 608 and the access node B 206 for the transmission of data via bearer 1, the terminal device 608 continues to monitor the reference signals s102. Measurements of the reference signals are assessed in step s220 against criteria in a similar manner as described above in respect of steps s202 and s210. If the criteria are met, the terminal device 608 transmits a measurement report s222 to the source access node (access node A 204).

In response to receiving the measurement report s222, the source access node A 204 performs handover preparation for the radio connections supporting the transmission of data for bearers 2 and 3 (step s224), and subsequently transmits a handover command s226 to the terminal device 608. The handover command may include resources reserved by the target access node B 206 for the establishment of radio connections for the transmission of data associated with bearers 2 and 3.

In response to receiving the handover command s226, the terminal device 608 establishes the radio connections with the target access node B 206, for the transmission of data associated with bearers 2 and 3, for example by means of a handover complete message s228.

In some embodiments, when (or immediately before) dual connectivity is established (e.g. at step s218), the target network access node B 206 assumes the role of SgNB and the source network access node A assumes the role of MgNB. In some embodiments, the roles are switched (that is, the target network access node B 206 assumes the role of MgNB and the source network access node A assumes the role of SgNB) substantially concurrently with the establishment of the radio connections between the terminal device 608 and the target access node B 206 which support bearers 2 and 3 (e.g. at the same time as, or responsive to, step s228).

Following the establishment of the radio connections for the transmission of data for bearers 2 and 3, the terminal device operates bearers 2 and 3 in a single connectivity mode, while bearer 1 remains in a split bearer configuration (step s230).

Subsequently, based on, for example, measurements of uplink transmissions by the terminal device 608, the terminal device 608 is configured to operate bearer 1 in single connectivity mode. As such, the radio connection between the terminal device 608 and the source access node A 204 is released. This may be by means of an RRC reconfiguration message s232, transmitted from the target access node B 206 to the terminal device 608.

As described above, in some embodiments, a mobility procedure may result in one or more bearers temporarily being operated in a dual connectivity configuration. In dual connectivity, network access nodes are specified as being either master network access nodes or secondary network access nodes, and user equipment can connect to the network through both master and secondary network access nodes at the same time.

In order to be able to handle a message carried by a split bearer, a terminal device (such as the terminal device 608) is provided with two medium access control (MAC) entities: a master cell group MAC (MCG MAC) and a secondary cell group MAC (SCG MAC), plus corresponding radio link control (RLC) and packet data convergence protocol (PDCP). These are included in the resources of the terminal device for split bearer handling.

For terminal devices configured for dual connectivity and split bearer transport, user traffic from the core network can be received at the master eNB (MeNB) or master gNB (MgNB) as a split bearer, and then divided between the MeNB and the secondary eNB (SeNB) (or the MgNB and secondary gNB (SgNB)) for handling and passing to the terminal device. Alternatively, in other split bearer configurations, the data may be transmitted to or from the core network from/to the SgNB or SeNB (in other words, the bearer is 'split' at the SgNB/SeNB). Any traffic on a SCG bearer is received from the core network at the SeNB and transported using resources of the SeNB to the terminal device.

It has been recognised that the use of dual connectivity to support a terminal device during handover may involve a secondary network access node switching roles to become a master network access node, see, for example, "SgNB to MgNB reconfiguration for Oms interruption handover", 3GPP TSG-RAN WG2 #97bis, R2-1703381, Spokane, USA, 3-7 Apr. 2017 [3].

In some embodiments, different keys are assigned to different bearers or groups of bearers. Specifically, any two bearers which may be the subject of different mobility procedures do not share the same key. Similarly, a bearer which may be the subject of a dual connectivity configuration as part of its respective mobility procedure may be assigned keys which are distinct from keys used for bearers for which dual connectivity is not used as part of the mobility procedure.

For example, in FIG. 8, the keys used for bearer 1 may be different from those used for bearers 2 and 3; the keys used for bearers 2 and 3 may be the same or different.

In some embodiments of the present technique, each bearer is assigned its own key prior to the first mobility procedure (s20 in FIG. 5).

In some embodiments of the present technique, the key associated with a given bearer is not changed during the mobility procedures. For example, bearer 1 has KeNB1 and bearers 2 and 3 have, respectively, KeNB 2 and KeNB 3. In some embodiments, the source access node may indicate whether a key change is needed during HO whether or not different centralised units are involved; furthermore, in some embodiments, the source access node may indicate that no key change is required in respect of one or more of the bearers.

Alternatively, in some embodiments, a conventional key hierarchy (whereby each KeNB is specific to a terminal device while in a given cell) is used, but with the addition of a bearer-specific parameter to the security algorithm. In some such embodiments, the KeNB for a terminal device is not changed during a mobility procedure or dual connectivity configuration establishment or during role switching by the source and target access nodes when the terminal device is operating using a dual connectivity configuration. The source network access node may indicate explicitly whether an existing KeNB remains valid or not; this indication may be at a per-bearer level of granularity.

In some embodiments of the present technique, each bearer has its own security keys. For example, bearer 1 has its own set of keys which may or may not be updated when a radio connection with the target access node is established.

Other bearers may apply either conventional security keys hierarchy or have individual keys.

In some embodiments, therefore, it is not necessary to change security keys for all the bearers as part of a mobility procedure. In other words, for example, the use of a bearer specific key avoids the need to maintain two keys for the same set of bearers when involved in a early handover or dual connectivity.

Examples of techniques by which the target access node B 206 transitions from SgNB to MgNB may be completed for bearers which operate in dual connectivity or split bearer configuration during the handover are described in co-pending application EP 17163988.3, which is hereby incorporated by reference in its entirety.

According to such techniques, the transition in respect of a bearer (such as, for example, bearer 1 in FIG. 8) may occur as described below. Although the description is provided in terms of keys derived according to LTE principles, it will be readily apparent that the same method of transition can be applied when one or both of the source and target access nodes operate according to a New Radio (NR) technology.

In a dual connectivity context the master network access node may use a key designated KeNB and the secondary network access node may use a key designated SKeNB. The SKeNB is generated by the master network access node and terminal device using a key derivation function having the KeNB and a secondary cell group counter as inputs (it does not use a cell ID/PCI as an input). The SKeNB is passed from the master network access node to the secondary network access node when adding a secondary cell group. The SKeNB is then used by the secondary network access node and terminal device to generate KUPenc (key for user plane encryption) for the secondary network access node. Further details can be found in ETSI TS 136 300 V13.2.0 (2016-01)/3GPP TS 36.300 version 13.2.0 Release 13 [4], the contents of which are herein incorporated by reference, and in particular FIG. 14.1-2.

Initially (e g immediately after step s216 of FIG. 8), the source network access node 204 is configured as a master network access node for the dual connectivity and is associated with a master network access node security key (e.g. a KeNB) and the target network access node is configured as a secondary network access node for the dual connectivity and is associated with a secondary network access node security key (e.g. a SKeNB). The derivation and sharing of the master network access node security key and the secondary network access node security key may be based on conventional techniques. For example, the source network access node may derive the secondary network access node security key from the master network access node security key in accordance with established practices, for example using a key derivation function, and may convey an indication of the secondary network access node security key to the target network access node (for example, at step s206) and the terminal device (for example, at step s208). It will be appreciated that in some implementations the secondary network access node security key itself may not be sent from the source network access node 204 to the target network access node 206 and/or the terminal device 608, but rather an indication that allows the target network access node and the terminal device to independently derive the secondary network access mode security key may be sent instead. If the secondary network access node security key itself is sent, it will typically be encrypted. Nonetheless, for terminological convenience, the process of conveying information to allow a security key to be derived may be referred to herein as simply sending the security key.

Subsequently (e.g. in response to message s222) it is determined the current dual connectivity role of the target network access node (i.e. the network access node currently acting as a secondary network access node for the dual connectivity with the terminal device) should be switched, and in particular the source network access node for the handover should be configured as a new master network access for supporting dual connectivity with the terminal device. This may be based on determining that the terminal device is moving away from the coverage of the first network access node (currently acting as master network access node) and towards the coverage of a further network access node. The decision may be made by either one of the source and target network access nodes according to the implementation at hand.

The target network access node (e.g. the network access node B 206 which is to switch from acting as a secondary network access node to a master network access node) derives a new master network access node security (KeNB) to be used by the target network access node when it becomes master network access node.

The target network access node conveys an indication of the new master network access node security key to the terminal device 608 and the core network 202, thereby allowing the target network access node to switch from operating as a secondary network access node to a master network access node for the terminal device, in respect of data transmitted via bearer 1. It will be appreciated that as with SKeNB, the new master network access node security key itself may not be sent from the source network access node 204 to the target network access node 206 and/or the terminal device 608, but rather an indication that allows the target network access node and the terminal device to independently derive the new master network access mode security key may be sent instead. To the extent any security keys are sent between elements of the wireless communications system, they may be encrypted. Nonetheless, and as already mentioned above, for terminological convenience, the process of conveying information to allow a security key to be derived may be referred to herein as simply sending the security key.

Semi-persistent scheduling (SPS) provides an efficient means to schedule a series of transmissions and is therefore suitable for applications with periodic, predictable traffic patterns. An SPS configuration is by default associated with the bearer having a highest priority. However, in some scenarios, a terminal device may be configured with more than one bearer having an equally high priority level. For example, a bearer for voice-over-IP (VoIP) traffic and a bearer for IMU data may be configured to have the same (highest) priority.

According to some embodiments, in order to specify the transmissions for which SPS-assigned resources are intended to be used, an access node may indicate to the terminal device that SPS-assigned resources are to be associated with a logical channel identity (ID), which is associated with a particular RLC or MAC protocol entity.

In response to this indication, the terminal device may select uplink traffic for transmission on a resource which has been allocated by means of SPS, the selection being based on the indicated logical channel ID.

In conventional mobility procedures, a single procedure is carried out for each cell transition by a terminal device. As will be apparent from the above, in embodiments of the present technique, two or more mobility procedures are applied in respect of a given transition from one cell to another by a given terminal device. The two or more procedures may each apply to radio connections associated with (in other words, supporting the transmission of data for) one or more bearers. Preferably, the selection of mobility procedure, the criteria for triggering each mobility procedure and assignment to the respective bearer(s) is based on the quality of service requirements associated with each bearer.

One or more of the mobility procedures may be based on an early handover, wherein, following an initial determination to prepare the handover, the terminal device receives an indication of resources reserved in the target cell and, following a subsequent determination to proceed, receives a command to perform the handover to the target cell.

One or more of the mobility procedures may comprise establishing one or more bearers in a dual connectivity or split bearer configuration. Preferably, such a mobility procedure is used for radio connections associated with bearers having an extremely low latency tolerance and/or very low packet loss requirement.

In some embodiments, bearer 1 may be configured in a dual connectivity mode, supported by radio connections between the terminal device and, respectively, a source access node (such as the access node A 206) and a further access node (not illustrated). The mobility procedures of, for example, FIG. 5 as described above may, in such embodiments, comprise the termination of the radio connections (supporting all bearers) between the terminal device and the a source access node and the establishment of radio connections between the terminal device and the a target access node to support all bearers. In such embodiments, bearer 1 may remain in a dual connectivity configuration throughout the procedure, and any radio connections between the terminal device and the further access node remain established. In some such embodiments, the target access node takes on the role of MgNB in respect of the dual connectivity configuration for bearer 1 substantially at the same time that the handover of other bearers is completed.

In some embodiments, one or more bearers may be already established in a dual connectivity configuration prior to the first of the mobility procedures described herein. In addition, or alternatively, one or more bearers may remain in a dual connectivity configuration after the completion of the mobility procedures. In some such embodiments, the transition of an access node from the MgNB role to the SgNB role may comprise one of the respective mobility procedures described above, for example in the description of FIG. 5.

In some embodiments of the present technique, different security keys are generated for use by different data. Preferably, bearers which are subject to different mobility procedures do not use the same keys. In such embodiments, where a mobility procedure comprises establishing one or more bearers in a dual connectivity or split bearer configuration, the target access node transitions from secondary network access node to master network access node prior to, or at, the completion of the mobility procedure. In some embodiments, the transition from secondary network access node to master network access node in respect of a first bearer occurs substantially simultaneously with the establishment of a radio connection associated with a second bearer between the terminal device and the target access node.

In some embodiments of the present technique, one or more mobility procedures, which are performed in respect of a subset of the bearers configured for a terminal device, may make use of techniques conventionally applied to handovers of all bearers for a terminal device. For example, a mobility procedure may use a RACH-less handover and/or a make-before-break handover.

Where one or more mobility procedures comprise multiple stages (e.g., where each stage is triggered based on assessment of measured radio conditions), a single assessment, using common criteria, may trigger a stage (or the entirety) of more than one mobility procedure. For example, in the example illustrated in FIG. 8 above, steps s210 and s220 may comprise a single assessment. In such an example, steps of the procedure may be combined and/or re-ordered. For example, where the same criteria are used in steps s210 and s220 then steps s212 and s222 may be combined into a single measurement report, steps s226 and s214 may be combined into a single message (transmitted after step s224 is completed), and steps s216 and s228 may be combined into a single message.

In another example, the determination that a radio connection with a target access node is to be established for one bearer, and the determination to initiate handover preparation (i.e. the request to the target access node to reserve resources) for a different bearer may be based on the same criteria.

In some embodiments, the criteria for triggering a mobility procedure (or phase thereof) are defined in relative terms, relative to criteria for triggering a different mobility procedure (or different phase of the same mobility procedure). For example, referring to FIG. 8, the criteria for the determination at step s202 may be in terms of a received signal reference power of reference signals received from access node A 204 falling below a first predetermined threshold; the criteria for the determination at step s210 may require that the received signal reference power of reference signals received from access node A 204 has fallen to 3 dB below the threshold at which the decision at s202 was triggered.

In some embodiments where a first mobility procedure results in the configuration of a bearer in a split-bearer or dual connectivity configuration by means of first and second radio connections between the terminal device and the source and target access nodes respectively, the completion of a subsequent mobility procedure may trigger the release of the radio connection associated with the split bearer between the terminal device and the source access node, thereby removing the split bearer configuration applicable to the first bearer.

For example, in FIG. 8, in some embodiments the RRC Configuration message s232 which reconfigures bearer 1 to no longer operate according to a split bearer configuration is not transmitted, and the terminal device is configured to release the connection for bearer 1 with the source access node A 204 at substantially the same time as the establishment of the radio connections for bearers 2 and 3 with the target access node B 206.

The determination to initiate a mobility procedure (or a stage thereof) may be made by the terminal device 608 or the source access node A 204, based on one or more of: measurements of radio transmissions by the source access node A 204 received at the terminal device 608; measurements of radio transmissions by the target access node A 206 received at the terminal device 608; measurements of radio transmissions by the terminal device 608 received at the source access node A 204; radio resource management (RRM) policies at the source access node A 204; traffic load at the source access node A 204. Different criteria may apply for different mobility procedures (or stages thereof) and the respective determinations at to whether to proceed may be made by different entities.

In FIG. 5, the procedure is illustrated with reference to two bearers and two mobility procedures; in FIGS. 6 and 7, embodiments are illustrated in which two mobility procedures are used for a terminal device configured with three bearers. The number of mobility procedures and bearers is not limited, and embodiments within the scope of the techniques described herein may use any number (greater than one) of mobility procedures.

It will be appreciated that the procedures illustrated in FIG. 6, FIG. 7 and FIG. 8 comprise many steps which may be omitted, combined or re-ordered, and that in some embodiments, steps or features illustrated in one or more of FIG. 6, FIG. 7 and FIG. 8 may be combined. For example, the process in FIG. 8 may be modified so that, as shown in FIG. 7, some or all of the determinations which result in the mobility procedures being triggered are carried out by the access node A 204, instead of by the terminal device 608.

It will be appreciated that while the present disclosure has in some respects focused on implementations in an LTE-based and/or 5G network for the sake of providing specific examples, the same principles can be applied to other wireless communications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless communications system is not significance to the principles of operation described herein. It may further be noted various example approaches discussed herein rely on information which is exchanged/communicated between various elements of the wireless communications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless communications system is not significance to the principles of operation described herein.

Respective features of the present disclosure are defined by the following numbered paragraphs:

Paragraph 1. A method of operating a terminal device in a wireless communication network, the wireless communication network comprising a first network access node associated with a first cell of the wireless communication network and a second network access node associated with a second cell of the wireless communication network, the method comprising:
establishing, by the terminal device, a first radio connection between the terminal device and the first network access node for supporting the transmission of data via a first bearer and a second radio connection between the terminal device and the first network access node for supporting the transmission of data via a second bearer;
in accordance with a difference between a quality of service for the data transmission via the first bearer and a quality of service for the data transmission via the second bearer, establishing a third radio connection between the terminal device and the second network access node for supporting the transmission of the data via the first bearer; and
after establishing the third radio connection between the terminal device and the second network access node, establishing a fourth radio connection between the terminal device and the second network access node for supporting the transmission of the data via the second bearer.

Paragraph 2. The method of paragraph 1, comprising, prior to establishing the fourth radio connection,
configuring the terminal device to operate the first bearer in a dual connectivity mode wherein the first and second radio connections combine to support the transmission of the data via the first bearer.

Paragraph 3. The method of paragraph 2, comprising
releasing, by the terminal device, the first radio connection with the first network access node when the fourth radio connection with the second network access node is established.

Paragraph 4. The method of paragraph 2, comprising
configuring the terminal device to continue to operate the first bearer in the dual connectivity mode after establishing the fourth radio connection with the second network access node, and
after establishing the fourth radio connection with the second network access node, releasing, by the terminal device, the first radio connection with the first network access node.

Paragraph 5. The method of any of paragraphs 1 to 4, wherein
establishing the third radio connection between the terminal device and the second network access node is in response to a first predetermined criteria being satisfied; and
establishing the fourth radio connection between the terminal device and the second network access node is in response to a second predetermined criteria being satisfied.

Paragraph 6. The method of any of paragraphs 1 to 5, comprising
measuring radio channel conditions between the terminal device and the second network access node;
determining if the radio channel conditions for the second network access node satisfy a third predefined criteria, and if so, transmitting to the first network access node an indication that the radio channel conditions for the second network access node satisfy the third predefined criterion;

receiving and storing an indication of connection information for use by the terminal device for establishing the third radio connection; and receiving an indication that the terminal device should connect to the second network access node, wherein establishing the third radio connection between the terminal device and the second network access node comprises transmitting signalling to the second network access node using the stored connection information to initiate the third radio connection to the second network access node in response to receiving the indication that the terminal device should connect to the second network access node.

Paragraph 7. A method of operating a first network access node associated with a first cell of a wireless communications network, the method comprising establishing a first radio connection between a terminal device and the first network access node for supporting the transmission of data via a first bearer and a second radio connection between the terminal device and the first network access node for supporting the transmission of data via a second bearer;

in accordance with a difference between a quality of service for the data transmission via the first bearer and a quality of service for the data transmission via the second bearer, determining that a first criteria has been met in respect of a radio communications channel between the terminal device and a second network access node associated with a second cell of the wireless communications network, in response to determining that the first criteria has been met, transmitting to the second network access node a request for the establishment of a third radio connection between the terminal device and the second network access node for supporting the transmission of data via the first bearer, determining that a second criteria has been met in respect of the radio communications channel between the terminal device and the second network access node, in response to determining that the second criteria has been met, transmitting to the second network access node a request for the establishment of a fourth radio connection between the terminal device and the second network access node for supporting the transmission of data via the second bearer.

Paragraph 8. The method of paragraph 7, wherein the determining that a first criteria has been met in respect of a radio communications channel between the terminal device and a second network access node comprises at least one of receiving a measurement report from the terminal device, measuring an uplink reference signal transmitted by the terminal device, and receiving a report based on measurements of uplink reference signals transmitted by the terminal device from the second network access node.

Paragraph 9. The method of paragraph 7, comprising
in response to determining that the first criteria have been met, transmitting an indication to the terminal device that it is to operate to operate the first bearer in a dual connectivity mode wherein the first and second radio connections combine to support the transmission of the data via the first bearer.

Paragraph 10. The method of any of paragraphs 7 to 9, comprising
determining that an end-to-end latency requirement associated with the first bearer is not compatible with a forwarding to the first network access node of data received from the terminal device by the second network access node via the third radio channel; and responsive to the determining, transmitting a request to the second network access node requesting the second network access node to establish a connection with a core network entity for the transmission of the data received via the third radio channel.

Paragraph 11. The method of any of paragraphs 7 to 10, comprising
determining for each of a plurality of bearers, a bearer-specific security key.

Paragraph 12. The method of any of paragraphs 7 to 11, comprising
indicating to the second network access node that a key which is valid for the terminal device in the first cell is valid for the terminal device in the second cell, wherein a centralised unit associated with the first cell is different from a centralised unit associated with the second cell.

Paragraph 13. The method of any of paragraphs 7 to 11, comprising
indicating to the second network access node that a key to be used for the terminal device in the second cell is to be derived from a bearer-specific parameter.

Paragraph 14. A method of operating a first network access node associated with a first cell of a wireless communications network, the method comprising establishing a first radio connection between a terminal device and the first network access node for supporting the transmission of data via a first bearer and a second radio connection between the terminal device and the first network access node for supporting the transmission of data via a second bearer, in accordance with a difference between a quality of service for the data transmission via the first bearer and a quality of service for the data transmission via the second bearer, determining that a first criteria has been met in respect of a radio communications channel between the terminal device and a second network access node associated with a second cell of the wireless communications network, in response to determining that the first criteria have been met, transmitting to the terminal device an indication instructing the terminal device to establish a third radio connection for supporting transmission of data via the first bearer with the second network access node, determining that a second criteria has been met in respect of the radio communications channel between the terminal device and the second network access node, in response to determining that the second criteria have been met, transmitting to the terminal device an indication instructing the terminal device to establish a fourth radio connection for supporting transmission of data via the second bearer.

Paragraph 15. The method of paragraph 14, comprising
determining that an end-to-end latency requirement associated with the first bearer is not compatible with a forwarding to the first network access node of data received from the terminal device by the second network access node via the third radio channel; and responsive to the determining, transmitting a request to the second network access node requesting the second network access node to establish a connection with a core network entity for the transmission of the data received via the third radio channel.

Paragraph 16. A method of operating a second network access node associated with a second cell of a wireless communications network, the method comprising
- receiving a request from a first network access node associated with a first cell of the wireless communications network to establish a first radio channel with a terminal device for supporting the transmission of data via a first bearer,
- establishing the first radio channel with the terminal device,
- after establishing the first radio channel with the terminal device for the first bearer, receiving a request from the first network access node to establish a second radio channel with the terminal device for the transmission of data associated with a second bearer, and
- establishing the second radio channel with the terminal device.

Paragraph 17. The method of paragraph 16, comprising configuring the second network access node to act as a secondary network access node for a dual connectivity mode of operation for the first bearer of the terminal device in which the first network access node acts as a master network access node and the second network access node acts as a secondary network access node,
- the first network access node being associated with a master network access node security key for the first bearer and the second network access node being associated with a secondary network access node security key for the first bearer,
- the secondary network access node security key being derived from the master network access node security key and established by the second network access node from information received from the first network access node;
- establishing, while the second network access node is acting as secondary network access node for the dual connectivity mode of operation for the first bearer of the terminal device, that the second network access node should switch to acting as a master network access node for the dual connectivity mode of operation for the first bearer of the terminal device;
- deriving a new master network access node security key to be used by the second network access node when it is switched to acting as a master network access node for the dual connectivity mode of operation for the first bearer of the terminal device; and
- configuring the second network access node to act a master network access node for the dual connectivity mode of operation for the terminal device using the new master network access node security key.

Paragraph 18. The method of any of paragraphs 16 to 17, comprising
- receiving data from the terminal device associated with the first bearer, and
- forwarding the data to the first network access node.

Paragraph 19. The method of any of paragraphs 16 to 17, comprising
- determining that an end-to-end latency requirement associated with the first bearer is not compatible with a forwarding of data received from the terminal device via the first radio channel to the first network access node; and
- responsive to the determining, establishing a connection with a core network entity for the transmission of the data received via the first radio channel.

Paragraph 20. The method of any of paragraphs 1 to 19 wherein the first bearer is associated with an end-to-end latency requirement of less than around one millisecond.

Paragraph 21. The method of any of paragraphs 1 to 20 wherein data from an inertial measurement unit of a head-mountable display is transmitted using the first bearer.

Paragraph 22. The method of any of paragraphs 1 to 21 wherein video data is transmitted using the second bearer.

Paragraph 23. The method of paragraph 22 wherein the video data comprises at least one of data from a camera coupled to a head-mountable display and data for a video display coupled to the head-mountable display.

Paragraph 24. A terminal device for use in a wireless communication system, the wireless communication system comprising a first network access node associated with a first cell of the wireless communication network and a second network access node associated with a second cell of the wireless communication system, the terminal device comprising controller circuitry, transmitter circuitry and receiver circuitry configured to operate together such that the terminal device is operable:
- to establish a first radio connection between the terminal device and the first network access node for supporting the transmission of data via a first bearer and a second radio connection between the terminal device and the first network access node for supporting the transmission of data via a second bearer;
- in accordance with a difference between a quality of service for the data transmission via the first bearer and a quality of service for the data transmission via the second bearer, to establish a third radio connection between the terminal device and the second network access node for supporting the transmission of the data via the first bearer; and
- after establishing the third radio connection between the terminal device and the second network access node, to establish a fourth radio connection between the terminal device and the second network access node for supporting the transmission of the data via the second bearer.

Paragraph 25. Circuitry for a terminal device for use in a wireless communication system, the wireless communication system comprising a first network access node associated with a first cell of the wireless communication system and a second network access node associated with a second cell of the wireless communication system, the circuitry comprising controller circuitry, transmitter circuitry and receiver circuitry configured to operate together such that the circuitry is operable:
- to establish a first radio connection between the terminal device and the first network access node for supporting the transmission of data via a first bearer and a second radio connection between the terminal device and the first network access node for supporting the transmission of data via a second bearer;
- in accordance with a difference between a quality of service for the data transmission via the first bearer and a quality of service for the data transmission via the second bearer, to establish a third radio connection between the terminal device and the second network access node for supporting the transmission of the data via the first bearer; and
- after establishing the third radio connection between the terminal device and the second network access node, to establish a fourth radio connection between the terminal device and the second network access node for supporting the transmission of the data via the second bearer.

Paragraph 26. A first network access node for use in a wireless telecommunication system comprising a terminal device, the first network access node and a second network access node, the first network access node comprising controller circuitry and transceiver circuitry configured to operate together such that the first network access node is operable:
- to establish a first radio connection between the terminal device and the first network access node for supporting the transmission of data via a first bearer and a second radio connection between the terminal device and the first network access node for supporting the transmission of data via a second bearer;
- in accordance with a difference between a quality of service for the data transmission via the first bearer and a quality of service for the data transmission via the second bearer, to determine that a first criteria has been met in respect of a radio communications channel between the terminal device and a second network access node associated with a second cell of the wireless communications network,
- in response to determining that the first criteria has been met, to transmit to the second network access node a request for the establishment of a third radio connection between the terminal device and the second network access node for supporting the transmission of data via the first bearer,
- to determine that a second criteria has been met in respect of the radio communications channel between the terminal device and the second network access node,
- in response to determining that the second criteria has been met, to transmit to the second network access node a request for the establishment of a fourth radio connection between the terminal device and the second network access node for supporting the transmission of data via the second bearer.

Paragraph 27. Circuitry for a first network access node for use in a wireless telecommunication system comprising a terminal device, the first network access node and a second network access node, the circuitry comprising controller circuitry and transceiver circuitry configured to operate together such that the circuitry is operable:
- to establish a first radio connection between the terminal device and the first network access node for supporting the transmission of data via a first bearer and a second radio connection between the terminal device and the first network access node for supporting the transmission of data via a second bearer;
- in accordance with a difference between a quality of service for the data transmission via the first bearer and a quality of service for the data transmission via the second bearer, to determine that a first criteria has been met in respect of a radio communications channel between the terminal device and a second network access node associated with a second cell of the wireless communications network,
- in response to determining that the first criteria has been met, to transmit to the second network access node a request for the establishment of a third radio connection between the terminal device and the second network access node for supporting the transmission of data via the first bearer,
- to determine that a second criteria has been met in respect of the radio communications channel between the terminal device and the second network access node,
- in response to determining that the second criteria has been met, to transmit to the second network access node a request for the establishment of a fourth radio connection between the terminal device and the second network access node for supporting the transmission of data via the second bearer.

Paragraph 28. A first network access node for use in a wireless telecommunication system comprising a terminal device, the first network access node and a second network access node, the first network access node comprising controller circuitry and transceiver circuitry configured to operate together such that the first network access node is operable:
- to establish a first radio connection between a terminal device and the first network access node for supporting the transmission of data via a first bearer and a second radio connection between the terminal device and the first network access node for supporting the transmission of data via a second bearer,
- in accordance with a difference between a quality of service for the data transmission via the first bearer and a quality of service for the data transmission via the second bearer, to determine that a first criteria has been met in respect of a radio communications channel between the terminal device and a second network access node associated with a second cell of the wireless communications network,
- in response to determining that the first criteria have been met, to transmit to the terminal device an indication instructing the terminal device to establish a third radio connection for supporting transmission of data via the first bearer with the second network access node,
- to determine that a second criteria has been met in respect of the radio communications channel between the terminal device and the second network access node,
- in response to determining that the second criteria have been met, to transmit to the terminal device an indication instructing the terminal device to establish a fourth radio connection for supporting transmission of data via the second bearer.

Paragraph 29. Circuitry for a first network access node for use in a wireless telecommunication system comprising a terminal device, the first network access node and a second network access node, the circuitry comprising controller circuitry and transceiver circuitry configured to operate together such that the circuitry is operable:
- to establish a first radio connection between a terminal device and the first network access node for supporting the transmission of data via a first bearer and a second radio connection between the terminal device and the first network access node for supporting the transmission of data via a second bearer,
- in accordance with a difference between a quality of service for the data transmission via the first bearer and a quality of service for the data transmission via the second bearer, to determine that a first criteria has been met in respect of a radio communications channel between the terminal device and a second network access node associated with a second cell of the wireless communications network,
- in response to determining that the first criteria have been met, to transmit to the terminal device an indication instructing the terminal device to establish a third radio connection for supporting transmission of data via the first bearer with the second network access node, to determine that a second criteria has been met in respect of the radio communications channel between the terminal device and the second network access node, in response to determining that the second criteria have been met, to transmit to the terminal device an indication instructing the terminal device to establish a fourth radio connection for supporting transmission of data via the second bearer.

Paragraph 30. A second network access node for use in a wireless telecommunication system comprising a terminal device, a first network access node and the second network access node, the second network access node comprising controller circuitry and transceiver circuitry configured to operate together such that the first network access node is operable:

to receive a request from a first network access node associated with a first cell of the wireless communications network to establish a first radio channel with a terminal device for supporting the transmission of data via a first bearer, to establish the first radio channel with the terminal device, after establishing the first radio channel with the terminal device for the first bearer, to receive a request from the first network access node to establish a second radio channel with the terminal device for the transmission of data associated with a second bearer, and to establish the second radio channel with the terminal device.

Paragraph 31. Circuitry for a second network access node for use in a wireless telecommunication system comprising a terminal device, a first network access node and the second network access node, the circuitry comprising controller circuitry and transceiver circuitry configured to operate together such that the circuitry is operable:

to receive a request from a first network access node associated with a first cell of the wireless communications network to establish a first radio channel with a terminal device for supporting the transmission of data via a first bearer, to establish the first radio channel with the terminal device, after establishing the first radio channel with the terminal device for the first bearer, to receive a request from the first network access node to establish a second radio channel with the terminal device for the transmission of data associated with a second bearer, and to establish the second radio channel with the terminal device.

Paragraph 32. A head-mountable display comprising an inertial measurement unit, a terminal device according to paragraph 24, wherein data from the inertial measurement unit is transmitted using the first bearer.

Paragraph 33. The head-mountable display of paragraph 32 comprising at least one of a camera and a video display, wherein video data is transmitted using the second bearer.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP document RP-160671, "New SID Proposal: Study on New Radio Access Technology," NTT DOCOMO, RAN #71, Gothenburg, Sweden, 7 to 10. Mar. 2016.

[2] Holma H. and Toskala A, "LTE for UMTS OFDMA and SC-FDMA based radio access", John Wiley and Sons, 2009.

[3] "SgNB to MgNB reconfiguration for 0 ms interruption handover", 3GPP TSG-RAN WG2 #97bis, R2-1703381, submitted for meeting at Spokane, USA, 3-7 Apr. 2017

[4] ETSI TS 136 300 V13.2.0 (2016-01)/3GPP TS 36.300 version 13.2.0 Release 13

What is claimed is:

1. A method of operating a terminal device in a wireless communication network, the wireless communication network comprising a first network access node associated with a first cell of the wireless communication network and a second network access node associated with a second cell of the wireless communication network, the method comprising:

establishing, by the terminal device, a first radio connection between the terminal device and the first network access node for supporting transmission via a first bearer;

establishing, by the terminal device, a second radio connection between the terminal device and the first network access node for supporting transmission via a second bearer;

establishing, in accordance with a difference between a first quality of service (QOS) for the transmission via the first bearer and a second QoS for the transmission via the second bearer, a third radio connection between the terminal device and the second network access node for supporting the transmission via the first bearer;

configuring the terminal device to operate the first bearer in a dual connectivity mode, such that the terminal device is connected to both the first network node and the second network node with the first radio connection and the third radio connection for the transmission via the first bearer;

after establishing the third radio connection and configuring the terminal device to operate the first bearer in the dual connectivity mode, establishing a fourth radio connection between the terminal device and the second network access node for supporting the transmission via the second bearer; and releasing, by the terminal device, the first radio connection with the first network access node in response to the fourth radio connection with the second network access node being established and ending operation of the first bearer in the dual connectivity mode.

2. The method of claim 1, wherein in a case that an end-to-end latency requirement associated with the first bearer is not compatible with a forwarding to the first network access node of data received from the terminal device by the second network access node via the third radio connection, the first network access node transmits a request to the second network access node requesting the second network access node to establish a connection with a core network entity for a transmission received via the third radio connection.

3. The method of claim 1, wherein the establishing the third radio connection is performed in response to a first predetermined criteria being satisfied.

4. The method of claim 1, further comprising:
measuring radio channel conditions between the terminal device and the second network access node;
determining whether the radio channel conditions for the second network access node satisfy a predefined criteria, and if so, transmitting to the first network access node an indication that the radio channel conditions for the second network access node satisfy the predefined criteria;
receiving and storing an indication of connection information for use by the terminal device for establishing the third radio connection; and
receiving an indication that the terminal device should connect to the second network access node, wherein
the establishing the third radio connection between the terminal device and the second network access node comprises transmitting signaling to the second network access node using the stored connection information to initiate the third radio connection in response to receiving the indication that the terminal device should connect to the second network access node.

5. The method of claim 1, wherein the first bearer is associated with an end-to-end latency requirement of less than one millisecond.

6. The method of claim 1, wherein data from an inertial measurement unit of a head-mountable display is transmitted using the first bearer.

7. The method of claim 1, wherein video data is transmitted using the second bearer.

8. The method of claim 7, wherein the video data comprises at least one of data from a camera coupled to a head-mountable display and data for a video display coupled to the head-mountable display.

9. A terminal device which operates in a wireless communication network, the wireless communication network comprising a first network access node associated with a first cell of the wireless communication network and a second network access node associated with a second cell of the wireless communication network, the terminal device comprising:
processing circuitry configured to:
establish a first radio connection between the terminal device and the first network access node for supporting transmission via a first bearer;
establish a second radio connection between the terminal device and the first network access node for supporting transmission via a second bearer;
establish, in accordance with a difference between a first quality of service (QoS) for the transmission via the first bearer and a second QoS for the transmission via the second bearer, a third radio connection between the terminal device and the second network access node for supporting the transmission via the first bearer;
configure the terminal device to operate the first bearer in a dual connectivity mode, such that the terminal device is connected to both the first network node and the second network node with the first radio connection and the third radio connection for the transmission via the first bearer;
after the third radio connection is established and the terminal device is configured to operate the first bearer in the dual connectivity mode, establish a fourth radio connection between the terminal device and the second network access node for supporting the transmission via the second bearer; and
release, by the terminal device, the first radio connection with the first network access node in response to the fourth radio connection with the second network access node being established and end operation of the first bearer in the dual connectivity mode.

10. The terminal device of claim 9, wherein in a case that an end-to-end latency requirement associated with the first bearer is not compatible with a forwarding to the first network access node of data received from the terminal device by the second network access node via the third radio connection, the first network access node transmits a request to the second network access node requesting the second network access node to establish a connection with a core network entity for a transmission received via the third radio connection.

11. The terminal device of claim 9, wherein the processing circuitry establishes the third radio connection in response to a first predetermined criteria being satisfied.

12. The terminal device of claim 9, wherein the processing circuitry is further configured to:
measure radio channel conditions between the terminal device and the second network access node;
determine whether the radio channel conditions for the second network access node satisfy a predefined criteria, and if so, transmit to the first network access node an indication that the radio channel conditions for the second network access node satisfy the predefined criteria;
receive and store an indication of connection information for use by the terminal device for establishing the third radio connection; and
receive an indication that the terminal device should connect to the second network access node, wherein
the processing circuitry establishes the third radio connection between the terminal device and the second network access node by transmitting signaling to the second network access node using the stored connection information to initiate the third radio connection in response to receiving the indication that the terminal device should connect to the second network access node.

13. The terminal device of claim 9, wherein the first bearer is associated with an end-to-end latency requirement of less than one millisecond.

14. The terminal device of claim 9, wherein data from an inertial measurement unit of a head-mountable display is transmitted using the first bearer.

15. The terminal device of claim 9, wherein video data is transmitted using the second bearer.

16. The terminal device of claim 15, wherein the video data comprises at least one of data from a camera coupled to a head-mountable display and data for a video display coupled to the head-mountable display.

17. A method of operating a terminal device in a wireless communication network, the wireless communication network comprising a first network access node associated with a first cell of the wireless communication network and a second network access node associated with a second cell of the wireless communication network, the method comprising:
establishing, by the terminal device, a first radio connection between the terminal device and the first network access node for supporting transmission via a first bearer;

establishing, by the terminal device, a second radio connection between the terminal device and the first network access node for supporting transmission via a second bearer;

establishing, in accordance with a difference between a first quality of service (QOS) for the transmission via the first bearer and a second QoS for the transmission via the second bearer, a third radio connection between the terminal device and the second network access node for supporting the transmission via the first bearer;

configuring, prior to establishing a fourth radio connection, the terminal device to operate the first bearer in a dual connectivity mode;

after establishing the third radio connection between the terminal device and the second network access node, establishing the fourth radio connection between the terminal device and the second network access node for supporting the transmission via the second bearer; and releasing, by the terminal device, the first radio connection with the first network access node in response to the fourth radio connection with the second network access node being established, wherein in a case that the first QoS is incompatible with forwarding a transmission, received by the second network access node from the terminal device via the third radio connection, to the first network access node, the first network access node transmits a request to the second access node that the second network access node establish a connection with a core network for transmission via the third radio connection.

* * * * *